US010318118B2

(12) United States Patent
Hanaoka et al.

(10) Patent No.: US 10,318,118 B2
(45) Date of Patent: Jun. 11, 2019

(54) VEHICULAR DISPLAY APPARATUS

(71) Applicant: TOYOTA JIDOSHA KABUSHIKI KAISHA, Toyota-shi, Aichi-ken (JP)

(72) Inventors: Kensuke Hanaoka, Toyota (JP); Seiichi Tanaka, Toyota (JP); Yasutomo Kato, Okazaki (JP); Shinya Fukuda, Otokuni-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 15/459,595

(22) Filed: Mar. 15, 2017

(65) Prior Publication Data

US 2017/0293370 A1 Oct. 12, 2017

(30) Foreign Application Priority Data

Apr. 7, 2016 (JP) ................. 2016-077516

(51) Int. Cl.
| | |
|---|---|
| *B60K 37/02* | (2006.01) |
| *G06F 3/038* | (2013.01) |
| *G06T 11/60* | (2006.01) |
| *G06F 3/0354* | (2013.01) |
| *G06F 3/0481* | (2013.01) |
| *G06F 3/0482* | (2013.01) |
| *G06F 3/0484* | (2013.01) |

(Continued)

(52) U.S. Cl.
CPC ............ *G06F 3/0482* (2013.01); *B60K 37/02* (2013.01); *G06F 3/0383* (2013.01); *G06F 3/03547* (2013.01); *G06F 3/0485* (2013.01); *G06F 3/04815* (2013.01); *G06F 3/04842* (2013.01); *G06F 3/04886* (2013.01); *G06T 11/60* (2013.01); *B60K 2350/1024* (2013.01); *B60K 2350/1032* (2013.01); *G06F 3/0488* (2013.01); *G06F 3/04817* (2013.01)

(58) Field of Classification Search
CPC .................................................. G06F 3/04812
See application file for complete search history.

(56) References Cited

U.S. PATENT DOCUMENTS

| | | | | |
|---|---|---|---|---|
| 7,434,177 | B1 * | 10/2008 | Ording ................ | G06F 3/04842 345/157 |
| 7,526,738 | B2 * | 4/2009 | Ording ................ | G06F 3/04842 345/157 |

(Continued)

FOREIGN PATENT DOCUMENTS

| | | |
|---|---|---|
| JP | H07-160416 A | 6/1995 |
| JP | 2004-345549 A | 12/2004 |

(Continued)

*Primary Examiner* — Patrick F Marinelli
(74) *Attorney, Agent, or Firm* — Oliff PLC

(57) ABSTRACT

A vehicular display apparatus includes a display section, a pointing device, and a display control section. The display control section is configured to display an operation screen on the display section. The display control section is configured to generate an image that includes one of an object and an object group across a specified area on the operation screen, and execute processing of setting a part of the one of the object and the object group in a different display mode from the other part of the one of the object and the object group when the operation finger is recognized by a recognition section.

6 Claims, 12 Drawing Sheets

(51) Int. Cl.
*G06F 3/0485* (2013.01)
*G06F 3/0488* (2013.01)

(56) References Cited

U.S. PATENT DOCUMENTS

| | | | | |
|---|---|---|---|---|
| 8,032,843 | B2* | 10/2011 | Ording | G06F 3/04842 |
| | | | | 715/779 |
| 8,466,871 | B2* | 6/2013 | Ishii | B60K 37/06 |
| | | | | 345/156 |
| 8,555,184 | B2* | 10/2013 | Hong | G06F 3/04855 |
| | | | | 715/702 |
| 8,640,044 | B2* | 1/2014 | Ording | G06F 3/04842 |
| | | | | 715/769 |
| 8,640,045 | B2* | 1/2014 | Ording | G06F 3/04842 |
| | | | | 715/765 |
| 9,024,864 | B2* | 5/2015 | Dunton | G06F 3/0482 |
| | | | | 345/156 |
| 9,600,139 | B2* | 3/2017 | Kim | G06F 3/0482 |
| 9,684,436 | B2* | 6/2017 | Ording | G06F 3/04842 |
| 2007/0262965 | A1 | 11/2007 | Hirai et al. | |
| 2007/0288860 | A1* | 12/2007 | Ording | G06F 3/04842 |
| | | | | 715/779 |
| 2011/0107255 | A1* | 5/2011 | Kim | G06F 3/0482 |
| | | | | 715/786 |
| 2011/0265002 | A1* | 10/2011 | Hong | G06F 3/04855 |
| | | | | 715/702 |
| 2012/0036480 | A1* | 2/2012 | Warner | G06F 3/04847 |
| | | | | 715/833 |
| 2013/0147749 | A1* | 6/2013 | Matthews | G06F 3/04883 |
| | | | | 345/173 |
| 2013/0241861 | A1* | 9/2013 | Griffin | G06F 3/0482 |
| | | | | 345/173 |
| 2015/0007108 | A1* | 1/2015 | Ozcelik | G06F 3/0482 |
| | | | | 715/810 |
| 2015/0169112 | A1* | 6/2015 | Chen | G06F 3/0412 |
| | | | | 345/174 |
| 2015/0345068 | A1* | 12/2015 | Coffman | D06F 58/28 |
| | | | | 715/771 |
| 2015/0347828 | A1* | 12/2015 | Kuboyama | G06K 9/3241 |
| | | | | 382/103 |
| 2016/0048323 | A1* | 2/2016 | Laubach | G06F 3/0416 |
| | | | | 345/173 |
| 2016/0062507 | A1 | 3/2016 | Suzuki | |
| 2016/0321230 | A1* | 11/2016 | Wang | G06F 17/246 |
| 2016/0364029 | A1* | 12/2016 | Miller | G06F 3/03547 |
| 2017/0293370 | A1* | 10/2017 | Hanaoka | B60K 37/02 |
| 2017/0329406 | A1* | 11/2017 | Dabic | G06F 3/016 |

FOREIGN PATENT DOCUMENTS

| | | |
|---|---|---|
| JP | 2006-072854 A | 3/2006 |
| JP | 2014-211861 A | 11/2014 |

\* cited by examiner

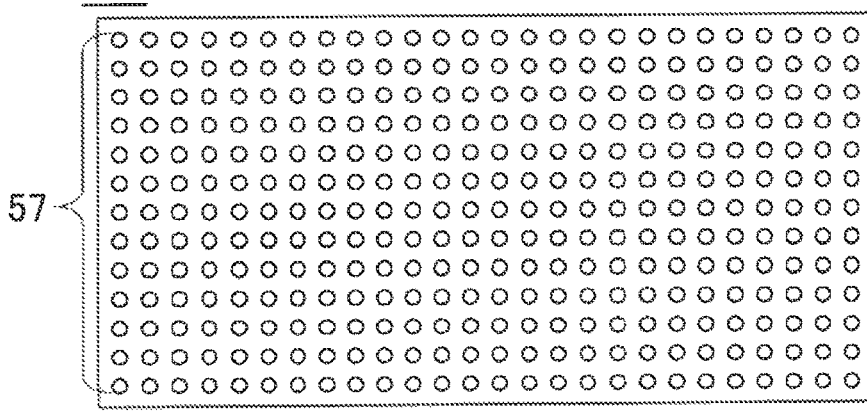

FIG. 7A
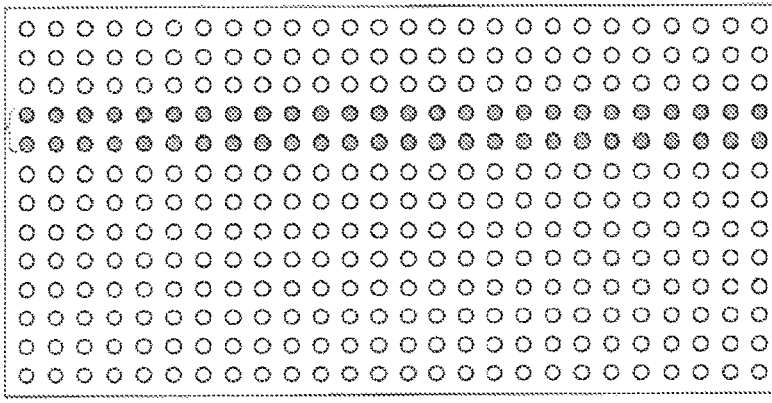
FIG. 7B
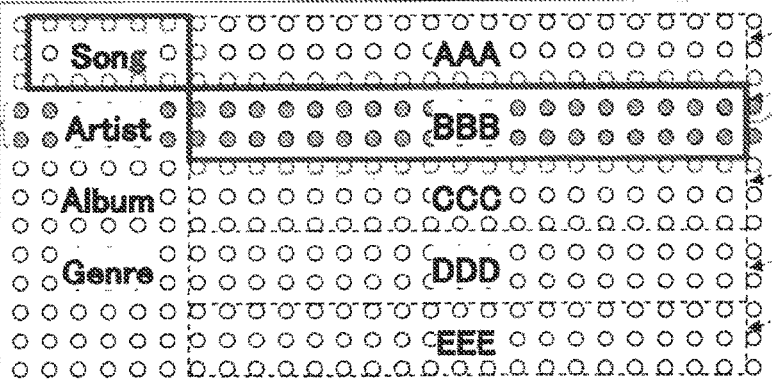
FIG. 7C

FIG. 8A
FIG. 8B
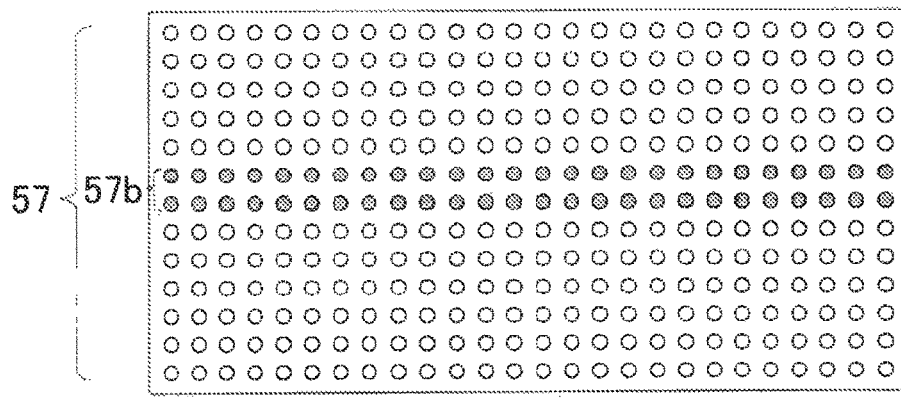
FIG. 8C
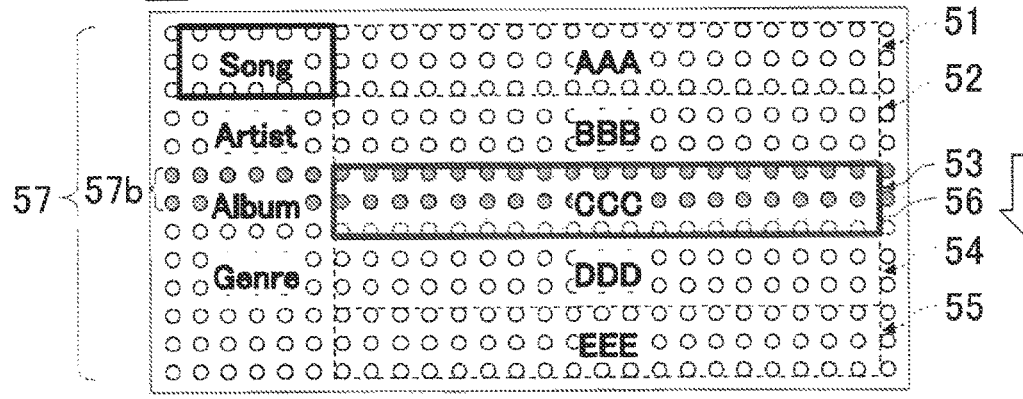

VEHICULAR DISPLAY APPARATUS

INCORPORATION BY REFERENCE

The disclosure of Japanese Patent Application No. 2016-077516 filed on Apr. 7, 2016 including the specification, drawings and abstract is incorporated herein by reference in its entirety.

BACKGROUND

1. Technical Field

The disclosure relates to a vehicular display apparatus that displays an operation screen.

2. Description of Related Art

A vehicular display apparatus that displays a screen (an operation screen) enabling various operations of in-vehicle equipment by using a pointing device, which recognizes a position of a user's finger (hereinafter referred to as an "operation finger"), in an operation section has been known (for example, see Japanese Patent Application Publication No. 2004-345549 (JP 2004-345549 A)).

In JP 2004-345549 A, a technique of recognizing the position of the operation finger in the operation section and moving a cursor that selects an icon on the operation screen on the basis of position information of the operation finger when the user contacts the operation section of the pointing device and performs a slide operation of a specified amount or larger has been disclosed.

In addition, a technique of scrolling a plurality of selection targets (for example, a list) on the operation screen in accordance with movement of the operation finger in the operation section of the pointing device has been known.

SUMMARY

However, when the operation finger leaves the operation section even in the slightest amount due to a vibration or the like of a vehicle, there is a possibility that the pointing device can no longer recognize the operation finger. At this time, as long as the user moves the operation finger, the user cannot determine whether the pointing device recognizes the operation finger and thus can operate the operation screen or the pointing device does not recognize the operation finger and thus cannot operate the operation screen. That is, as long as the user checks whether the cursor can be moved or whether the list or the like can be scrolled, the user cannot determine whether the pointing device can operate the operation screen.

The disclosure provides a vehicular display apparatus that allows a user to easily determine whether a pointing device can operate an operation screen.

A vehicular display apparatus according to a first aspect of the disclosure includes: a display section; a pointing device that includes an operation section and a recognition section that recognizes an operation finger operating the operation section; and a display control section that is configured to display an operation screen on the display section, the operation screen including a plurality of selection targets, a selection operation of which is able to be performed by using the pointing device. The display control section is configured to: generate at least one of an image in which a cursor for selecting one selection target from the plurality of selection targets is moved and an image in which the plurality of selection targets that are arranged along a specified axis on the operation screen are scrolled in accordance with a position of the operation finger, which is recognized by the recognition section, on the operation section; generate an image that includes one of an object and an object group across a specified area on the operation screen; and execute processing of setting a part of the one of the object and the object group in a different display mode from the other part of the one of the object and the object group when the operation finger is recognized by the recognition section.

According to the above configuration, in the case where the pointing device (the recognition section) recognizes the operation finger, the part of the object or the object group, which is displayed on the operation screen, is in the different display mode (for example, a color, luminance, a shape, size, displacement, or the like differs) from the other part thereof. Accordingly, the user visually recognizes presence or absence of a partial change in the display mode of the object or the object group on the operation screen, and thus can easily determine whether the operation screen can be operated by the pointing device.

In addition, in the vehicular display apparatus according to the above aspect, the display control section may be configured to generate an image in which the part in the different display mode of the one of the object and the object group is moved along a moving direction of the operation finger when the operation finger, which is recognized by the recognition section, is moved with respect to the operation section.

According to the above configuration, in the case where the operation finger, which is recognized by the pointing device (the recognition section), is moved, the part in the different display mode of the object or the object group is moved along the moving direction of the operation finger. For example, there is a case where the operation finger possibly leaves the operation section due to a vibration of a vehicle or the like while the operation finger is moved. In such a case, the user visually recognizes whether the part in the different display mode is moved along the moving direction of the operation finger, and thus can easily determine whether a moving operation of the cursor or a scrolling operation of a list or the like by the pointing device can appropriately be continued.

In addition, in the vehicular display apparatus according to the above aspect, the display control section may be configured to generate the operation screen by composing a foreground image that includes the plurality of selection targets and a background image that includes one of the object and the object group.

According to the above configuration, the object or the object group is displayed as a background of the plurality of selection targets (a plurality of icons or the list configured by including a plurality of items) or the like that are displayed as a foreground. Thus, occurrence of a situation where visibility of the plurality of selection targets, the cursor indicative of a selection status of the plurality of selection targets, or the like worsens, which is resulted from a change in the display mode or the like of the object group, can be suppressed.

The disclosure can provide the vehicular display apparatus that allows the user to easily determine whether the operation screen can be operated by the pointing device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6A is a view of another example of the foreground image by the display apparatus according to the first embodiment;

FIG. 6B is a view of another example of the background image by the display apparatus according to the first embodiment;

FIG. 6C is a view of another example of the operation screen by the display apparatus according to the first embodiment;

FIG. 7A is a view of another example of the foreground image by the display apparatus according to the first embodiment;

FIG. 7B is a view of another example of the background image by the display apparatus according to the first embodiment;

FIG. 7C is a view of another example of the operation screen by the display apparatus according to the first embodiment;

FIG. 8A is a view of another example of the foreground image by the display apparatus according to the first embodiment;

FIG. 8B is a view of another example of the background image by the display apparatus according to the first embodiment;

FIG. 8C is a view of another example of the operation screen by the display apparatus according to the first embodiment;

DETAILED DESCRIPTION OF EMBODIMENTS

A description will hereinafter be made on modes for carrying out the disclosure with reference to the drawings.

First Embodiment

Figure 1:
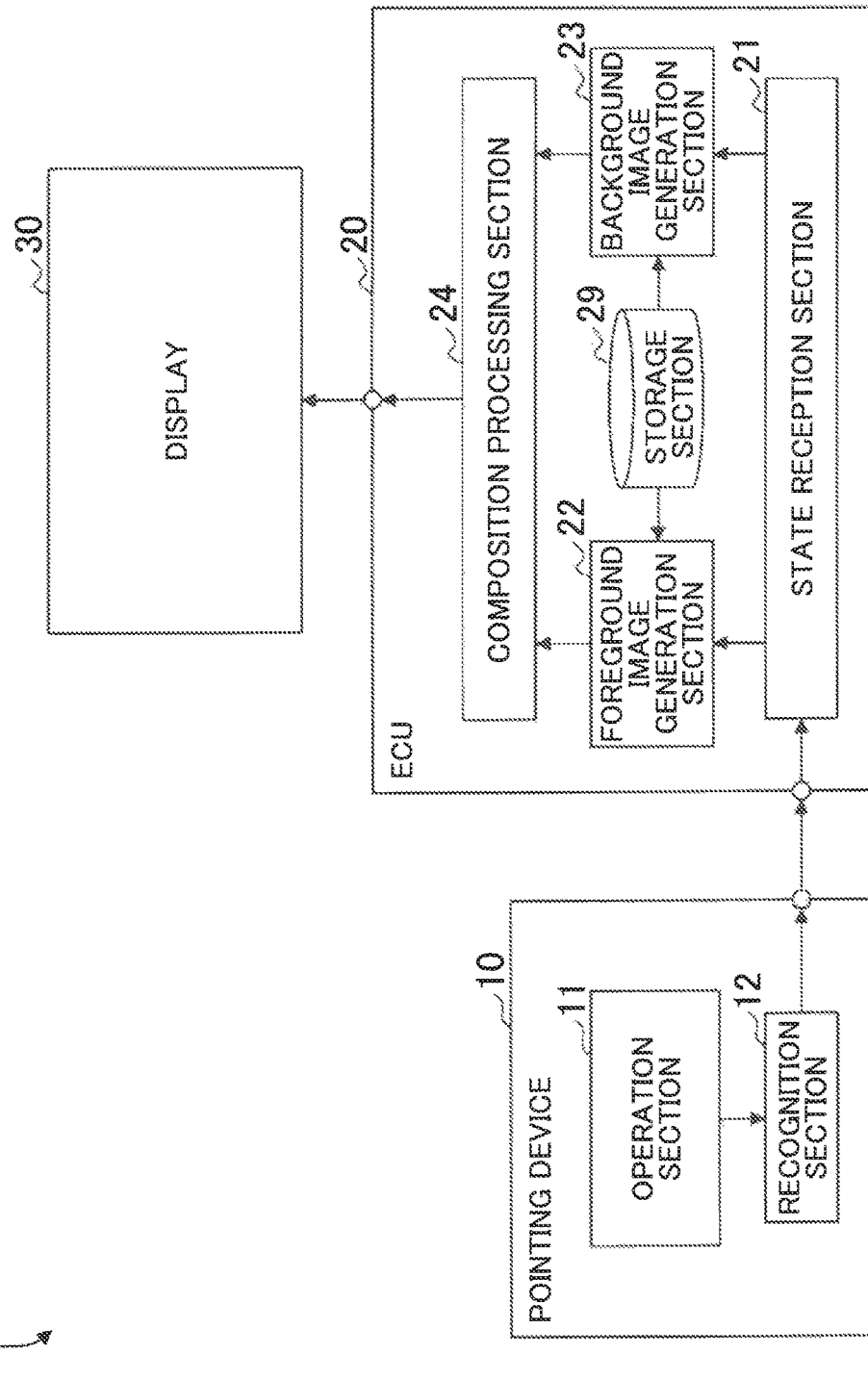
FIG. 1 is a block diagram that schematically shows one example of a configuration of a display apparatus.

FIG. 1 is a block diagram that schematically shows one example of a configuration of a display apparatus 1 according to this embodiment. The display apparatus 1 includes a pointing device 10, an electronic control unit (ECU) (a display control section) 20, and a display (a display section) 30. For example, the display apparatus 1 is mounted on a vehicle and displays a screen (an operation screen) that includes a plurality of selection targets (a plurality of icons or the like) on the display 30, a selection operation of which can be performed by using the pointing device 10. Hereinafter, a "vehicle" means the vehicle on which the display apparatus 1 is mounted unless otherwise noted.

The pointing device 10 is an input device that specifies a position on the operation screen, and is a touch pad, for example. The pointing device 10 includes an operation section 11 and a recognition section 12.

The operation section 11 is a portion of the pointing device 10 that is operated by a finger (an operation finger) of a user (for example, an occupant such as a driver of the vehicle). For example, the operation section 11 is a touch operation screen of the touch pad.

The recognition section 12 recognizes the operation finger on the operation section 11. For example, the recognition section 12 is an electrostatic pad of the touch pad. For example, the electrostatic pad has such a structure that an electrode (an electrostatic sensor) extends linearly in each of an X-direction and a Y-direction on a plane with an insulator being interposed therebetween, and outputs a detection signal of these electrodes (a signal corresponding to a change amount of electric charges stored in the electrodes). The recognition section 12 successively (that is, in every specified cycle) outputs a signal related to an operation state by the user (for example, a detection signal output by the electrostatic pad, hereinafter referred to as a "state signal") to the ECU 20. For example, the recognition section 12 outputs the state signal that corresponds to each coordinate (an x-coordinate and a y-coordinate) in a predetermined x-y-coordinate system by the operation section 11.

Note that the pointing device 10 is not limited to the touch pad or the like as long as adopting a mode of including: the operation section 11; and the recognition section 12 that recognizes the operation finger on the operation section 11. For example, the pointing device 10 may be a gesture recognition device that includes: a predetermined operation space (one example of the operation section 11); and a processing device (one example of the recognition section 12) that recognizes a position of the operation finger on the operation space on the basis of an image of the operation space captured by a camera.

Figure 2:
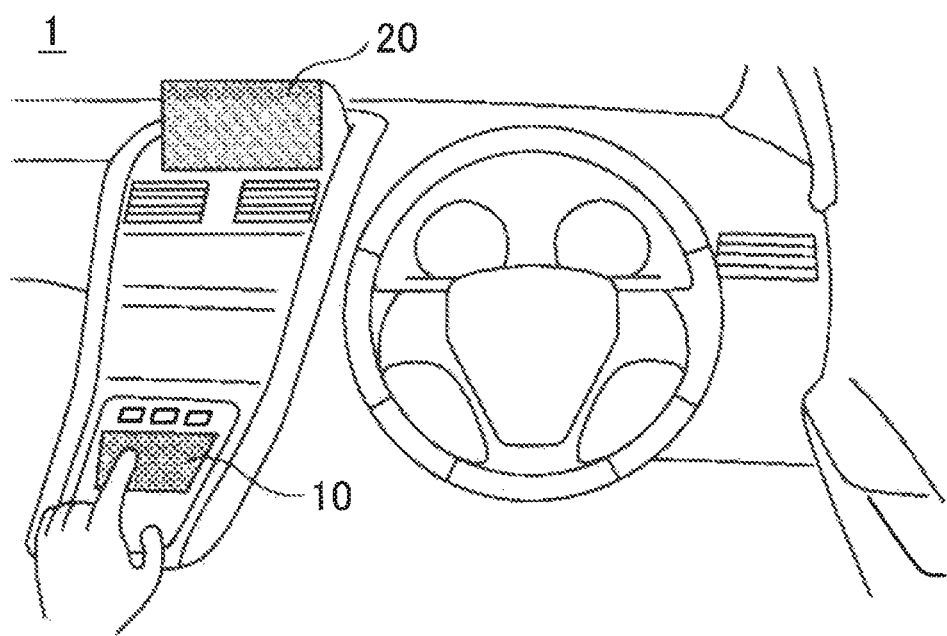
FIG. 2 is a view of one example of an in-vehicle mode of the display apparatus (a pointing device and a display)

The pointing device 10 is provided at an appropriate place in a vehicle cabin and is preferably arranged at a position where the driver can easily operate the pointing device 10, more specifically, a position where the driver's hand can reach the pointing device 10 while keeping a driving posture. For example, as shown in FIG. 2 (a view of one example of an in-vehicle mode of the display apparatus 1), the pointing device 10 (the touch pad in this example) may be arranged in a console box or around the console box.

The ECU 20 is one example of the display control section that displays the operation screen on the display 30, and is an electronic control unit that executes processing of generating the operation screen. The ECU 20 moves a cursor that selects one selection target of the plurality of selection targets on the operation screen in accordance with the position of the operation finger, which is recognized by the recognition section 12, on the operation section 11. For example, the ECU 20 is configured by including a microcomputer as a central component and realizes various types of control processing by executing various programs stored in ROM on a CPU. As a functional section that is realized by executing the one or more programs on the CPU, the ECU 20 includes a state reception section 21, a foreground image generation section 22, a background image generation section 23, and a composition processing section 24. In addition, the ECU 20 includes a storage section 29 as a predetermined storage area of non-volatile internal memory.

The state reception section 21 executes processing of receiving the state signal that is received from the pointing device 10 in every specified cycle. The state reception section 21 transmits the received state signal to the foreground image generation section 22 and the background image generation section 23.

The foreground image generation section 22 generates a foreground image of the operation screen that includes: the plurality of selection targets (a plurality of target components such as the icons), the selection operation of which can be performed by using the pointing device 10; and a cursor for selecting the one selection target from the plurality of selection targets. The cursor indicates the selected target component by emphatically displaying the target component such as the icon. For example, the cursor displays the selected target component in a mode of increasing luminance of the selected target component to be higher than that of the other target components, a mode of displaying the color of the selected target component in a different mode from the color of the other target components, a mode of surrounding the selected target component with a frame, or the like.

The foreground image generation section 22 determines a cursor position (that is, what is selected from the plurality of target components) on the basis of the state signal received from the state reception section 21. More specifically, the foreground image generation section 22 first computes the position on the operation screen that corresponds to the state signal. For example, the foreground image generation section 22 stores first corresponding relationship information in the storage section 29 in advance, the first corresponding relationship information making change amounts of the x-coordinate and the y-coordinate on the pointing device 10, which are based on the state signal, correlate with change amounts of the x-coordinate and the y-coordinate on the operation screen. In this way, on the basis of said first corresponding relationship information, the foreground image generation section 22 can compute the change amounts of the x-coordinate and the y-coordinate on the operation screen that correspond to an operation of the pointing device 10. Then, with initial values of the x-coordinate and the y-coordinate (representative coordinates indicative of an initial position of the cursor upon activation of the display apparatus 1) on the operation screen being references, the foreground image generation section 22 can successively update the x-coordinate and the y-coordinate on the operation screen in accordance with the successively received state signal from the pointing device 10.

Next, the foreground image generation section 22 determines a position of the cursor in accordance with the computed position on the operation screen. For example, the foreground image generation section 22 stores second corresponding relationship information in the storage section 29 in advance, the second corresponding relationship information making the position of the cursor (for example, a centroid coordinate of the cursor) on the operation screen correlate with the position on the operation screen. In this way, on the basis of said second corresponding relationship information, the foreground image generation section 22 can determine the position (the x-coordinate and the y-coordinate) of the cursor on the operation screen. Then, the foreground image generation section 22 generates a foreground image in a mode of arranging the plurality of target components such as the icons at predetermined positions and arranging the cursor at the determined position on the operation screen (that is, on the one target component that is arranged at the same position as the determined position on the operation screen).

The background image generation section 23 generates a background image of the operation screen that includes a graphic object or a graphic object group as collection of a number of the graphic objects (individual objects). The graphic object or the graphic object group is arranged across a specified area (for example, an area that includes an area where the plurality of target components are arranged) on the operation screen. For example, the graphic object may be a curved-surface shape surface object that is arranged across the specified area on the operation screen and imitates a water surface. In addition, for example, the graphic object group may be collection of a number of granular graphic objects (the individual objects) that are arranged across the specified area on the operation screen.

Similar to the foreground image generation section 22, for example, based on the first corresponding relationship information, the background image generation section 23 computes the position on the operation screen that corresponds to the state signal received from the state reception section 21.

In addition, on the basis of the state signal received from the state reception section 21, the background image generation section 23 determines whether the pointing device 10

(the recognition section 12) recognizes the operation finger. That is, in the case where the pointing device 10 is the touch pad, the background image generation section 23 determines whether the user's finger is in contact with the touch pad. In the case where the pointing device 10 is the gesture recognition device, the background image generation section 23 determines whether the user's finger is held on the operation space.

Then, when determining that the pointing device 10 (the recognition section 12) does not recognize the operation finger, the background image generation section 23 generates the background image that includes the graphic object or the graphic object group in a predetermined display mode. For example, the background image generation section 23 may generate the background image that includes the graphic object or the graphic object group in the predetermined display mode in which a difference that visually attracts the user's attention is not included in the entire graphic object or the entire graphic object group.

On the other hand, when determining that the pointing device 10 (the recognition section 12) recognizes the operation finger, the background image generation section 23 changes a display mode of a part of the graphic object to differ from a display mode of the other parts of the graphic object or changes a display mode of a part of the graphic object group to differ from a display mode of the other parts of the graphic object group. More specifically, the background image generation section 23 defines third corresponding relationship information in advance and stores the third corresponding relationship information in the storage section 29, the third corresponding relationship information making the part of the graphic object or the part of the graphic object group in the background image correlate with the position on the operation screen. Based on said third corresponding relationship information, the background image generation section 23 determines the part of the graphic object or the part of the graphic object group in the background image that corresponds to the computed position on the operation screen. Then, the background image generation section 23 generates the background image for which the determined part of the graphic object has the different display mode from the other parts of the graphic object or for which the determined part of the graphic object group has the different display mode from the other parts of the graphic object group. The "different display mode" means a display mode with a difference that is easily recognizable by the user who looks at the operation screen. The "different display mode" possibly includes a display mode with a different color, a display mode with difference luminance, a display mode with different size or a different shape (more specifically, a display mode in which a shape or size of the individual object corresponding to the part of the graphic object group differs from a shape or size of each of the other individual objects), a display mode with a different amount of displacement (including an amount of displacement in a virtual three-dimensional space in the background image), and the like. The background image that is generated by the background image generation section 23 will be described in detail below.

The composition processing section 24 executes processing of composing the foreground image, which is generated by the foreground image generation section 22, and the background image, which is generated by the background image generation section 23, to generate the operation screen. Then, the composition processing section 24 transmits a command signal that includes the generated operation screen to the display 30. In this way, the operation screen can be displayed on the di splay 30.

The storage section 29 stores the first corresponding relationship information in advance, the first corresponding relationship information defining a corresponding relationship between a change amount of an x-y coordinate (the x-coordinate and the y-coordinate) on the pointing device 10 and a change amount of an x-y coordinate (the x-coordinate and the y-coordinate) on the operation screen. The storage section 29 also stores the second corresponding relationship information in advance, the second corresponding relationship information defining a corresponding relationship between the position (the x-coordinate and the y-coordinate) on the operation screen and the position of the cursor on the operation screen. The storage section 29 further stores the third corresponding relationship information in advance, the third corresponding relationship information making the part of the graphic object or the part of the graphic object group in the background image correlate with the position on the operation screen. On the operation screen, an x-axis direction is one example of the first direction, and a y-axis direction is one example of the second direction.

For example, the display 30 is arranged at a remote position from the pointing device 10 and displays the operation screen that can be operated by the pointing device 10 in accordance with the command signal from the ECU 20 (the composition processing section 24). The display 30 is arranged at an appropriate position in the vehicle cabin, that is, at a position where the display 30 can easily and visually be recognized by the user (the driver). For example, as shown in FIG. 2, the display 30 may be arranged in a central section of an instrument panel. Alternatively, like a head-up display (HUD), the display 30 may be display means that directly displays the operation screen on eyesight of the user.

Next, with reference to FIG. 3A to FIG. 5C, a description will be made on one example of the operation screen that is generated by the display apparatus 1 according to this embodiment, more specifically, the foreground image generation section 22, the background image generation section 23, and the composition processing section 24 and that is displayed on the display 30.

Figure 3A:
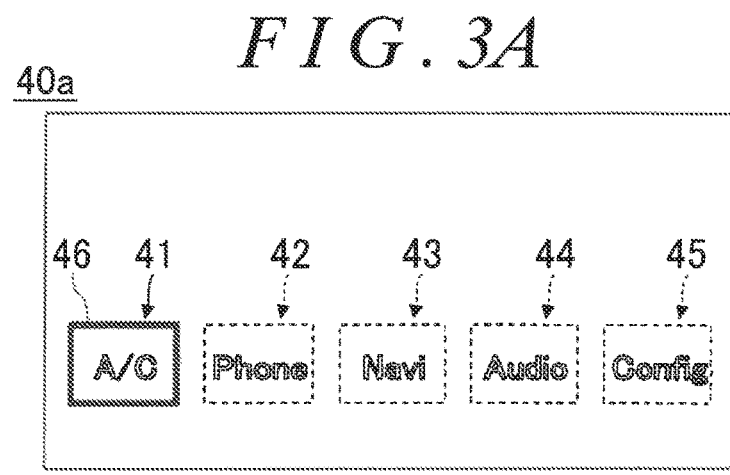
FIG. 3A is a view of one example of a foreground image by a display apparatus according to a first embodiment.
Figure 3B:
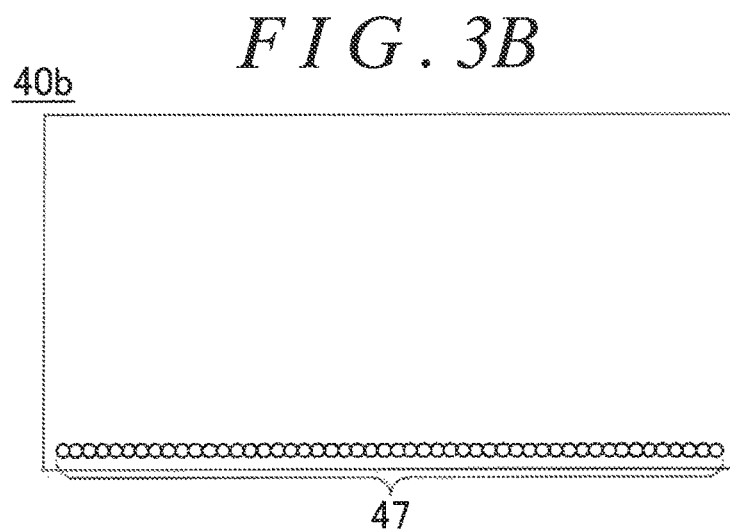
FIG. 3B is a view of one example of a background image by the display apparatus according to the first embodiment.
Figure 3C:
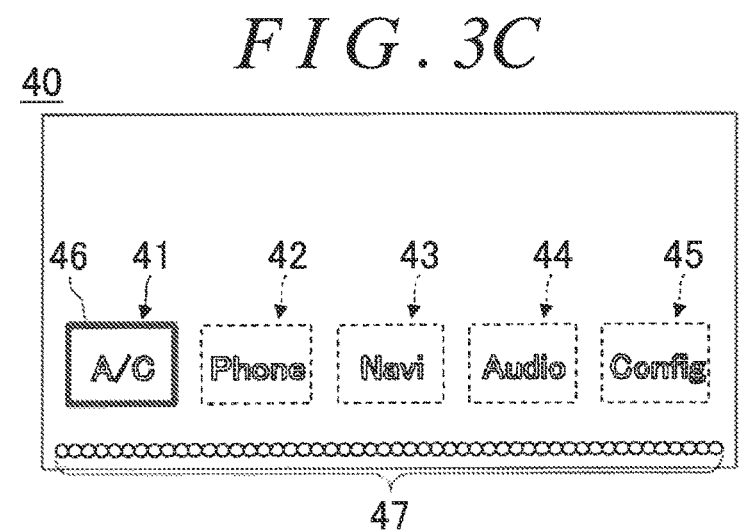
FIG. 3C is a view of one example of an operation screen by the display apparatus according to the first embodiment.
Figure 4A:
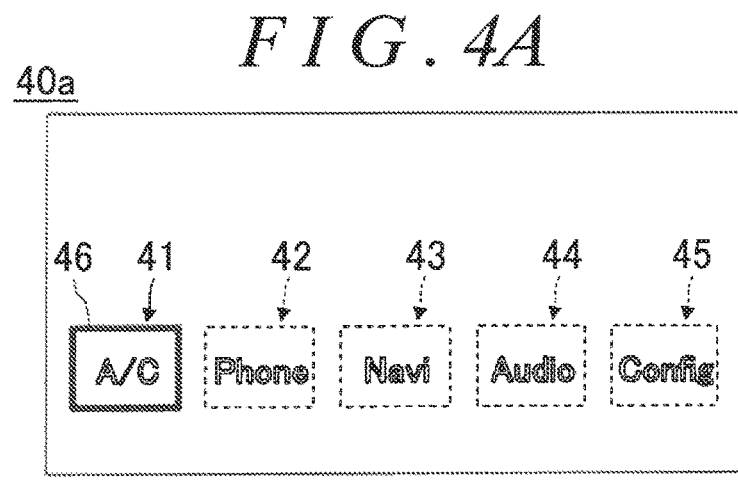
FIG. 4A is a view of the one example of the foreground image by the display apparatus according to the first embodiment.
Figure 4B:
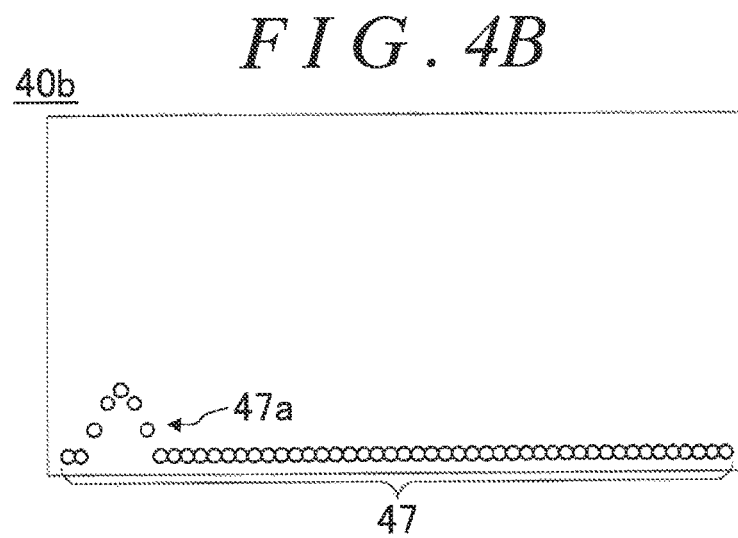
FIG. 4B is a view of the one example of the background image by the display apparatus according to the first embodiment.
Figure 4C:
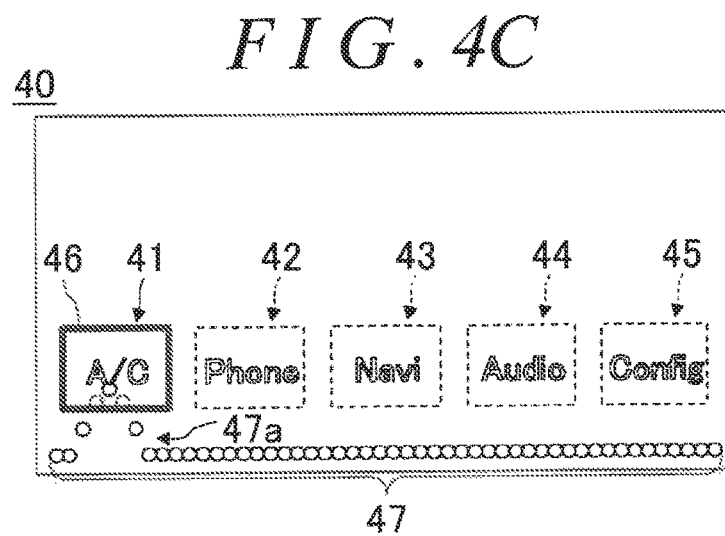
FIG. 4C is a view of the one example of the operation screen by the display apparatus according to the first embodiment.
Figure 5A:
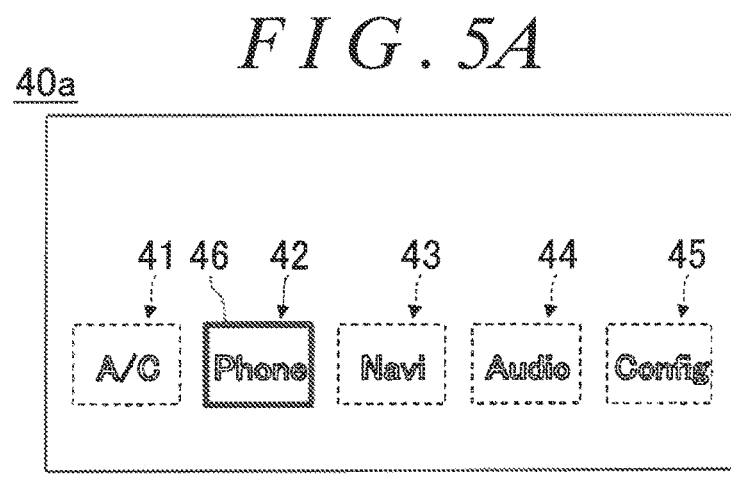
FIG. 5A is a view of the one example of the foreground image by the display apparatus according to the first embodiment.
Figure 5B:
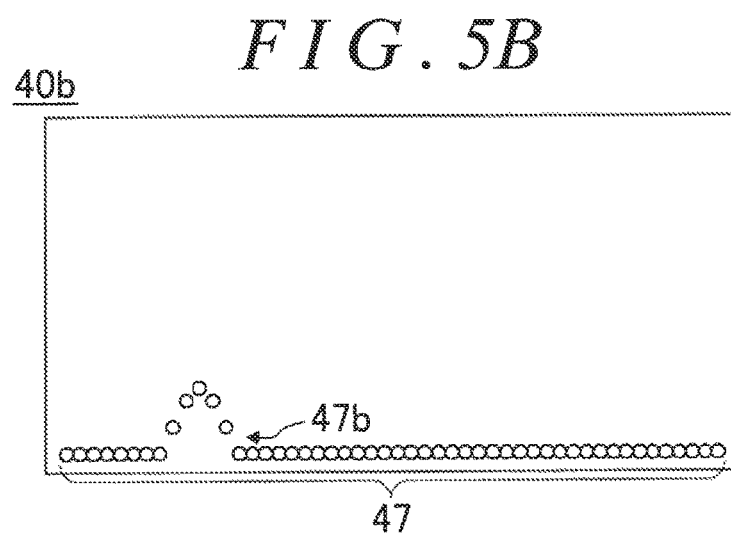
FIG. 5B is a view of the one example of the background image by the display apparatus according to the first embodiment.
Figure 5C:
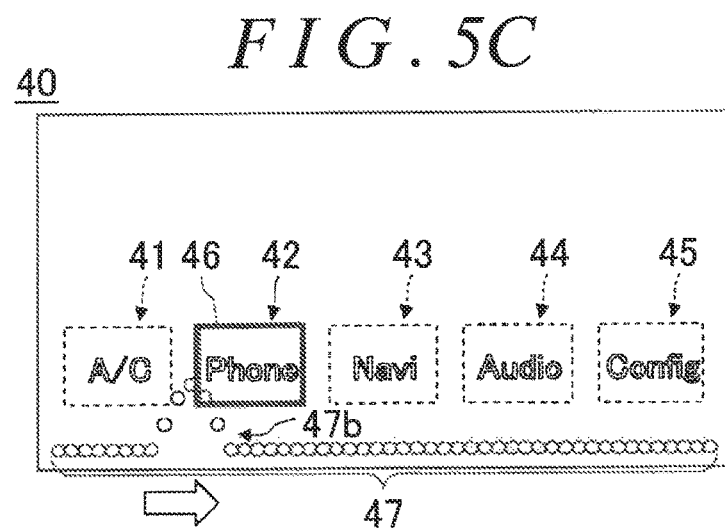
FIG. 5C is a view of the one example of the operation screen by the display apparatus according to the first embodiment.

FIG. 3A to FIG. 5C are views, each of which shows the one example of the operation screen by the display apparatus 1 (more specifically, the foreground image generation section 22, the background image generation section 23, and the composition processing section 24) according to this embodiment. FIG. 3A, FIG. 3B, and FIG. 3C respectively show a foreground image 40*a*, a background image 40*b*, and an operation screen 40 in a case where the pointing device 10 (the recognition section 12) does not recognize the operation finger. In addition, FIGS. 4A, 5A, FIGS. 4B, 5B, and FIGS. 4C, 5C respectively show the foreground image 40*a*, the background image 40*b*, and the operation screen 40 in a case where the pointing device 10 (the recognition section 12) recognizes the operation finger. More specifically, FIG. 4A, FIG. 4B, and FIG. 4C respectively show the foreground image 40*a*, the background image 40*b*, and the operation screen 40 at a time when a state shown in FIG. 3A, FIG. 3B, and FIG. 3C (a state where the pointing device 10 (the recognition section 12) does not recognize the operation finger) is shifted to a state where the pointing device 10 (the recognition section 12) recognizes the operation finger. FIG. 5A, FIG. 5B, and FIG. 5C respectively show the foreground image 40*a*, the background image 40*b*, and the operation screen 40 after the operation finger that is recognized by the recognition section 12 starts being moved from the state shown in FIG. 4A, FIG. 4B, and FIG. 4C.

First, with reference to FIGS. 3A to 3C, a description will be made on the operation screen 40 in the case where the pointing device 10 (the recognition section 12) does not recognize the operation finger.

As shown in FIG. 3A, the foreground image 40*a* includes: icons 41 to 45 as the selection targets; and a cursor 46 that selects either one of the icons 41 to 45. The icon 41 is a switch component that shifts to an operation screen for an air conditioner mounted on the vehicle. The icon 42 is a switch component that shifts to an operation screen for making a phone call. The icon 43 is a switch component that shifts to an operation screen for a navigation device mounted on the vehicle. The icon 44 is a switch component that shifts to an operation screen for an audio device mounted on the vehicle. The icon 45 is a switch component that shifts to an operation screen for making various types of setting of the display apparatus 1, for example. Positions of the icons 41 to 45 on the operation screen 40 are defined in advance, and the icons 41 to 45 are sequentially arranged from a left end to a right end at a slightly lower position from center in a vertical direction of the foreground image 40*a* (that is, the operation screen 40). In order to emphasize a state where either one of the icons 41 to 45 is selected, a mode of surrounding the selected one of the icons 41 to 45 with a frame is adopted for the cursor 46 in this example.

On the basis of the state signal received from the state reception section 21, the foreground image generation section 22 determines a position of the cursor 46 on the foreground image 40*a* (that is, the operation screen 40). Then, the foreground image generation section 22 arranges the icons 41 to 45 at the predetermined positions and generates the foreground image 40*a* of the operation screen 40 on which the cursor 46 is arranged at the determined position (more specifically, the same position as either one of the icons 41 to 45). Because the pointing device 10 (the recognition section 12) does not recognize the operation finger in the state shown in FIGS. 3A to 3C, the position of the cursor 46 corresponds to a position at termination of the last moving operation of the cursor 46 or the predetermined initial position of the cursor 46. In this example, as shown in FIG. 3A, the cursor 46 is arranged at the same position as the icon 41 (that is, on the icon 41) and is in a state of selecting the icon 41.

As shown in FIG. 3B, the background image 40*b* includes a graphic object group (hereinafter referred to as an "object group") 47 that is configured by including a large number of the granular graphic objects (hereinafter simply referred to as "grains"). The object group 47 is arranged in a mode of arranging the grains as components in a lateral line across a specified area on the operation screen 40, more specifically, a moving area of the cursor 46 in a lateral direction of the operation screen 40 at a lower end of the background image 40*b* (that is, the operation screen 40). When determining that the pointing device 10 (the recognition section 12) does not recognize the operation finger, the background image generation section 23 generates the background image 40*b* that includes the object group 47 in the predetermined display mode, that is, the display mode in which the grains are arranged in the lateral line (the object group 47 is arranged along the lateral direction) in this example.

Then, the composition processing section 24 composes the foreground image 40*a* in FIG. 3A and the background image 40*b* in FIG. 3B to generate the operation screen 40. As shown in FIG. 3C, the operation screen 40 includes: the icons 41 to 45 that are arranged in line from the left end to the right end at the slightly lower position from the center in the vertical direction; and the cursor 46 that is arranged at the same position as the icon 41 (that is, on the icon 41). The operation screen 40 also includes the object group 47 that is configured by including the grains arranged in line from the left end to the right end at a position further below the icons 41 to 45 and the cursor 46.

Next, with reference to FIGS. 4A to 4C, a description will be made on the operation screen 40 at a time when the state where the pointing device 10 (the recognition section 12) does not recognize the operation finger is shifted to a state where the pointing device 10 (the recognition section 12) recognizes the operation finger.

As shown in FIG. 4A, when the state of the operation screen 40 shown in FIG. 3C is shifted to the state where the pointing device 10 (the recognition section 12) recognizes the operation finger, the position of the cursor 46 is not changed. Thus, the foreground image generation section 22 generates the same foreground image 40*a* as in FIG. 3A.

When determining that the pointing device 10 (the recognition section 12) recognizes the operation finger on the basis of the state signal from the state reception section 21, as shown in FIG. 4B, the background image generation section 23 generates the background image 40*b* in which grains 47*a* as a part of the object group 47, which is correlated with the position on the operation screen 40 corresponding to the state signal, are in a different display mode from the grains of the other part of the object group 47. More specifically, the grains 47*a* are significantly displaced in the vertical direction (the x-axis direction) with respect to the other grains in the object group 47.

Then, the composition processing section 24 composes the foreground image 40*a* in FIG. 4A and the background image 40*b* in FIG. 4B to generate the operation screen 40. As shown in FIG. 4C, the operation screen 40 includes: the icons 41 to 45 that are arranged in line from the left end to the right end at the slightly lower position from the center in the vertical direction; and the cursor 46 that is arranged at the same position as the icon 41 (that is, on the icon 41). The operation screen 40 also includes the object group 47 that is arranged from the left end to the right end in the mode in which the grains 47*a* are significantly displaced in the vertical direction with respect to the other grains in the object group 47 at the position further below the icons 41 to 45 and the cursor 46. In this example, the grains 47*a* are configured by including five grains with a lateral position on the operation screen 40, which corresponds to the state signal from the state reception section 21 (the pointing device 10), being center and are displayed in a mode of partially overlapping the icon 41, which is selected by the cursor 46, in a background. In addition, an amount of displacement of each of the grains included in the grains 47*a* in the vertical direction differs. More specifically, of the grains 47*a*, the grain closest to the lateral position on the operation screen 40, which corresponds to the state signal, has the largest amount of the displacement in the vertical direction, and the amount of the displacement of the grain in the vertical direction is gradually reduced as the grain separates from the lateral position on the operation screen 40, which corresponds to the state signal.

As described above, when the pointing device 10 (the recognition section 12) recognizes the operation finger, the part (the grains 47*a*) of the object group 47 is set in the different display mode from the other part of the object group 47. More specifically, the grains 47*a* of the object group 47 correlated with the position on the operation screen 40, which corresponds to the state signal from the pointing device 10, (in other words, the position of the cursor 46) are set in the different display mode from the other grains in the object group 47. In this way, the user can easily comprehend the operation state on the operation screen 40. For example, there is a case where the operation finger of the user possibly leaves the operation section 11 due to a vibration or the like of the vehicle. At this time, the user recognizes that the grains 47a are displaced (raised) in the vertical direction, and thus can easily determine whether the operation screen 40 can be operated by the pointing device 10 (more specifically, whether an operable state continues). In addition, the user visually recognizes that the grains 47a are displaced (raised) in the vertical direction at substantially the same lateral position as the cursor 46 on the operation screen 40, and thus can easily comprehend (an indication of) the position of the cursor 46 at a start of the operation by using the pointing device 10. In particular, when the user is the driver of the vehicle, the user cannot gaze at the display 30. To handle this problem, the grains 47a as the part of the object group 47 are raised in the vertical direction. In this way, without gazing at the display 30, the user can easily comprehend whether the operation screen 40 can be operated by the pointing device 10, the position of the cursor 46, and the like. In addition, the grains 47a are displayed as the background of the icons 41 to 45 and the cursor 46. Thus, even when the grains 47a are raised in the vertical direction, occurrence of a situation where visibility of the icons 41 to 45 and the cursor 46 worsens can be suppressed.

Next, with reference to FIGS. 5A to 5C, a description will be made on the operation screen 40 after the operation finger, which is recognized by the recognition section 12, starts being moved.

Note that when the state shown in FIGS. 4A to 4C is shifted to a state shown in FIGS. 5A to 5C, the user performs an operation of moving the cursor 46 in a right direction by moving the operation finger in the right direction on the operation section 11.

As shown in FIG. 5A, the position of the cursor 46 is updated from the state shown in FIG. 4A along with the movement of the operation finger on the operation section 11. More specifically, based on the state signal from the state reception section 21, the foreground image generation section 22 determines (changes) the position of the cursor 46 to the same position as the icon 42 (that is, on the icon 42) on an immediate right side of the icon 41 and generates the foreground image 40a shown in FIG. 5A.

Similar to the case of FIG. 4B, when determining that the pointing device 10 (the recognition section 12) recognizes the operation finger on the basis of the state signal from the state reception section 21, as shown in FIG. 5B, the background image generation section 23 generates the background image 40b in which grains 47b as a part of the object group 47, which is correlated with the position on the operation screen 40 corresponding to the state signal, are in a different display mode from the other grains of the object group 47. At this time, the grains constituting the part of the object group 47 that is raised in the vertical direction are shifted from the grains 47a to the grains 47b in accordance with the movement of the operation finger on the operation section 11. More specifically, the grains 47b are arranged on a right side of the grains 47a, and the grains constituting the part of the object group 47 that is raised in the vertical direction are shifted to the right direction along a moving direction of the operation finger on the operation section 11. That is, the third corresponding relationship information stored in the above-described storage section 29 is set such that the grains constituting the part of the object group 47 that is raised in the vertical direction are shifted in the same direction by following the movement of the position on the operation screen 40 that corresponds to the state signal from the state reception section 21.

Then, the composition processing section 24 composes the foreground image 40a in FIG. 5A and the background image 40b in FIG. 5B to generate the operation screen 40. As shown in FIG. 5C, the operation screen 40 includes: the icons 41 to 45 that are arranged in line from the left end to the right end (in the lateral direction) at the slightly lower position from the center in the vertical direction; and the cursor 46 that is arranged at the same position as the icon 42 (that is, on the icon 42). The operation screen 40 also includes the object group 47 that is arranged from the left end to the right end in the mode in which the grains 47b are significantly displaced in the vertical direction with respect to the other grains at the position further below the icons 41 to 45 and the cursor 46. In this example, the grains 47b are configured by including the five grains with the lateral position on the operation screen 40, which corresponds to the state signal from the state reception section 21 (the pointing device 10), being the center and are displayed in a mode of partially overlapping the icon 42, which is selected by the cursor 46, in the background.

As described above, when the operation finger, which is recognized by the pointing device 10 (the recognition section 12), is moved on the operation section 11, the part of the object group 47 in the different display mode is moved along the moving direction of the operation finger. More specifically, the grains (the grains 47a, 47b) as the part of the object group 47 that are displayed in the different display mode (the mode of being raised in the vertical direction) are shifted in the same direction (an outlined arrow in FIG. 5C) by following the movement of the position on the operation screen 40 that corresponds to the state signal from the state reception section 21 (the pointing device 10). For example, there is the case where the operation finger possibly leaves the operation section 11 due to the vibration or the like of the vehicle while the operation finger is moved on the operation section 11. In such a case, the user visually recognizes whether the part of the object group 47 in the different display mode is moved (shifted) along the moving direction of the operation finger, and thus can easily determine whether the moving operation of the cursor 46 by the pointing device 10 can appropriately be continued. In addition, the user recognizes the direction in which the grains, which constitute the part of the object group 47 and are displayed in the different display mode, are shifted, thereby easily comprehending the moving direction of the cursor 46 on the operation screen 40.

Note that the object group 47 configured by arranging a number of the grains in the lateral direction is used in this example; however, the grains of the object group 47 may be joined to create the one graphic object. In such a case, when the state where the pointing device 10 (the recognition section 12) does not recognize the operation finger is shifted to the state where the pointing device 10 (the recognition section 12) recognizes the operation finger, a part of the graphic object that corresponds to the grains 47a is raised in the vertical direction. Then, in accordance with the movement of the operation finger, which is recognized by the pointing device 10, the part of the graphic object raised in the vertical direction is shifted from the part that corresponds to the grains 47a to a part that corresponds to the grains 47b (that is, moved along the moving direction of the operation finger). Also, in such a modified example, the same operational effects as those in this example can be realized.

In addition, the mode of significantly displacing (raising in the vertical direction) the part (the grains 47a, 47b) of the graphic object group with respect to the other part of the graphic object group is adopted as the "different display mode" in this example. However, the disclosure is not limited to said mode. With reference to FIG. 6A to FIG. 8C, a description will hereinafter be made on an operation screen 50 that includes another example of the "different display mode."

FIG. 6A to FIG. 8C are views that show another example of the operation screen by the display apparatus 1 (more specifically, the foreground image generation section 22, the background image generation section 23, and the composition processing section 24) according to this embodiment. FIG. 6A, FIG. 6B, and FIG. 6C respectively show a foreground image 50a, a background image 50b, and the operation screen 50 in the case where the pointing device 10 (the recognition section 12) does not recognize the operation finger. In addition, FIGS. 7A, 8A, FIGS. 7B, 8B, and FIGS. 7C, 8C respectively show the foreground image 50a, the background image 50b, and the operation screen 50 in the case where the pointing device 10 (the recognition section 12) recognizes the operation finger. More specifically, FIG. 7A, FIG. 7B, and FIG. 7C respectively show the foreground image 50a, the background image 50b, and the operation screen 50 at a time when a state shown in FIG. 6A, FIG. 6B, and FIG. 6C (the state where the pointing device 10 (the recognition section 12) does not recognize the operation finger) is shifted to the state where the pointing device 10 (the recognition section 12) recognizes the operation finger. FIG. 8A, FIG. 8B, and FIG. 8C respectively show the foreground image 50a, the background image 50b, and the operation screen 50 after the operation finger that is recognized by the recognition section 12 starts being moved from the state shown in FIG. 7A, FIG. 7B, and FIG. 7C.

First, with reference to FIGS. 6A to 6C, a description will be made on the operation screen 50 in a case where a moving operation of a cursor 56 is not performed.

As shown in FIG. 6A, the foreground image 50a includes: songs 51 to 55 as the selection targets; and the cursor 56 that selects either one of the songs 51 to 55. When the cursor 56 selects either one of the songs 51 to 55 by using the pointing device 10, either one of the songs 51 to 55 can be played from a specified audio source (for example, a CD or the like) in audio equipment that is mounted on the vehicle. Positions of the songs 51 to 55 on the operation screen 50 are defined in advance and are sequentially arranged from an upper end to a lower end within an area in the lateral direction that excludes a left end of the foreground image 50a (that is, the operation screen 50). In order to emphasize a state where either one of the songs 51 to 55 is selected, a mode of surrounding the selected one of the songs 51 to 55 with the frame is adopted for the cursor 56 in this example.

On the basis of the state signal received from the state reception section 21, the foreground image generation section 22 determines a position of the cursor 56 on the foreground image 50a (that is, the operation screen 50). Then, the foreground image generation section 22 arranges the songs 51 to 55 at the predetermined positions and generates the foreground image 50a of the operation screen 50 on which the cursor 56 is arranged at the determined position (more specifically, the same position as either one of the songs 51 to 55). Because the pointing device 10 (the recognition section 12) does not recognize the operation finger in the state shown in FIGS. 6A to 6C, the position of the cursor 56 corresponds to a position at termination of the last moving operation of the cursor 56 or a predetermined initial position of the cursor 56. In this example, as shown in FIG. 6A, the cursor 56 is arranged at the same position as the song 52 (that is, on the song 52) and is in a state of selecting the song 52.

As shown in FIG. 6B, the background image 50b includes a graphic object group (hereinafter referred to as an "object group") 57 that is configured by including a large number of the granular graphic objects (hereinafter simply referred to as "grains"). The object group 57 is arranged such that the grains as components are arranged at equally spaced intervals from right to left and up to down across a specified area on the background image 50b (that is, the operation screen 50), more specifically, an entire area on the operation screen 50 in the vertical direction and the lateral direction. When determining that the pointing device 10 (the recognition section 12) does not recognize the operation finger, the background image generation section 23 generates the background image 50b that includes the object group 57 in the predetermined display mode, that is, the display mode in which the grains in the same color are arranged at the equally spaced intervals from the right to the left and the up to the down in this example.

Then, the composition processing section 24 composes the foreground image 50a in FIG. 6A and the background image 50b in FIG. 6B to generate the operation screen 50. As shown in FIG. 6C, the operation screen 50 includes: the songs 51 to 55 that are arranged in line in the vertical direction; and the cursor 56 that is arranged at the same position as the song 52 (that is, on the song 52). The operation screen 50 also includes the object group 57 configured by including the grains in the same color, which are arranged at the equally spaced intervals from the right to the left and the up to the bottom across the entire area, in a background.

Next, a description will be made on the operation screen 50 at a time when the state where the pointing device 10 (the recognition section 12) does not recognize the operation finger is shifted to the state where the pointing device 10 (the recognition section 12) recognizes the operation finger with reference to FIGS. 7A to 7C.

As shown in FIG. 7A, when the state of the operation screen 50 shown in FIG. 6C is shifted to the state where the pointing device 10 (the recognition section 12) recognizes the operation finger, the position of the cursor 56 is not changed. Thus, the foreground image generation section 22 generates the same foreground image 50a as in FIG. 6A.

When determining that the pointing device 10 (the recognition section 12) recognizes the operation finger on the basis of the state signal from the state reception section 21, as shown in FIG. 7B, the background image generation section 23 generates the background image 50b in which grains 57a as a part of the object group 57, which is correlated with the position on the operation screen 50 corresponding to the state signal, are in a different display mode from the grains of the other part of the object group 57. More specifically, of the grains included in the object group 57, the grains 57a are grains in two rows near a vertical position on the operation screen 50, which corresponding to the state signal, and have a different shape from the other grains in the object group 57.

Then, the composition processing section 24 composes the foreground image 50a in FIG. 7A and the background image 50b in FIG. 7B to generate the operation screen 50. As shown in FIG. 7C, the operation screen 50 includes: the songs 51 to 55 that are arranged in line in the vertical direction; and the cursor 56 that is arranged at the same position as the song 52 (that is, on the song 52). The operation screen 50 also includes the object group 57 configured by including the grains, which are arranged at the equally spaced intervals from the right to the left and the up to the bottom across the entire area, in the background. The color of the grains 57a, which constitute the part of the object group 57, is displayed in the different mode from the color of the grains constituting the other part of the object group 57. In this example, the grains 57a are configured by including the grains in the two rows with the vertical position on the operation screen 50, which corresponds to the state signal from the state reception section 21 (the pointing device 10), being center and are displayed in a mode of partially overlapping the song 52, which is selected by the cursor 56, in the background.

As described above, in the case where the pointing device 10 (the recognition section 12) recognizes the operation finger, the part (the grains 47a) of the object group 47 is set in the different display mode from the other part of the object group 47. More specifically, the grains 57a of the object group 57 correlated with the position on the operation screen 50, which corresponds to the state signal from the pointing device 10, are set in the different display mode from the other grains in the object group 57. In this way, the same operational effects as those in the example shown in FIG. 3A to FIG. 5C can be realized. More specifically, the user recognizes a color change of the grains 57a as the part of the object group 57, and thus can easily determine whether the operation screen 50 can be operated by the pointing device 10 (more specifically, whether the operable state continues). In addition, by recognizing the color change of the grains 57a as the part at substantially the same vertical position as the cursor 56 on the operation screen 50, the user can easily comprehend (an indication of) the position of the cursor 56 at the start of the operation by using the pointing device 10. In addition, the grains 57a are displayed as the background of the songs 51 to 55 and the cursor 56. Thus, even when the color of the grains 57a is changed, occurrence of a situation where visibility of the songs 51 to 55 and the cursor 56 worsens can be suppressed.

Next, a description will be made on the operation screen 50 after the operation finger, which is recognized by the recognition section 12, starts being moved with reference to FIGS. 8A to 8C.

Note that when the state shown in FIGS. 7A to 7C is shifted to a state shown in FIGS. 8A to 8C, the user performs an operation of moving the cursor 56 downward by moving the operation finger downward on the operation section 11.

As shown in FIG. 8A, the position of the cursor 56 is updated from the state shown in FIG. 7A along with the movement of the operation finger on the operation section 11. More specifically, based on the state signal from the state reception section 21, the foreground image generation section 22 determines (changes) the position of the cursor 56 to the same position as the song 53 (that is, on the song 53) on an immediate lower side of the song 52 and generates the foreground image 50a shown in FIG. 8A.

Similar to the case of FIG. 7B, when determining that the pointing device 10 (the recognition section 12) recognizes the operation finger on the basis of the state signal from the state reception section 21, as shown in FIG. 8B, the background image generation section 23 generates the background image 50b in which grains 57b as a part of the object group 57, which is correlated with the position on the operation screen 50 corresponding to the state signal, are in a different display mode from the other grains of the object group 57. At this time, the grains that constitute the part in the different color of the object group 57 are shifted from the grains 57a to the grains 57b in accordance with the movement of the operation finger on the operation section 11. More specifically, the grains 57b are arranged on a lower side of the grains 57a, and the grains that constitute the part in the different color of the object group 57 are shifted downward along the moving direction of the operation finger on the operation section 11. That is, the third corresponding relationship information stored in the above-described storage section 29 is set such that the grains constituting the part in the different color of the object group 57 are shifted in the same direction by following the movement of the position on the operation screen 50 that corresponds to the state signal from the state reception section 21.

Then, the composition processing section 24 composes the foreground image 50a in FIG. 8A and the background image 50b in FIG. 8B to generate the operation screen 50. As shown in FIG. 8C, the operation screen 50 includes: the songs 51 to 55 that are arranged in line in the vertical direction; and the cursor 56 that is arranged at the same position as the song 53 (that is, on the song 53). The operation screen 50 also includes the object group 57 configured by including the grains, which are arranged at the equally spaced intervals from the right to the left and the up to the bottom across the entire area, in the background, and the color of the grains 57b as the part of the object group 57 is displayed in the different mode from the color of the other grains. In this example, the grains 57b are configured by including the grains in the two rows with the vertical position on the operation screen 50, which corresponds to the state signal from the state reception section 21 (the pointing device 10), being the center and are displayed in a mode of partially overlapping the song 53, which is selected by the cursor 56, in the background.

As described above, when the operation finger, which is recognized by the pointing device 10 (the recognition section 12), is moved on the operation section 11, the part of the object group 47 in the different display mode is moved along the moving direction of the operation finger. More specifically, the grains (the grains 57a, 57b) that constitute the part of the object group 57 displayed in the different display mode (the mode of the different color from the other grains) are shifted in the same direction (an outlined arrow in FIG. 8C) by following the movement of the position on the operation screen 50 that corresponds to the state signal from the state reception section 21 (the pointing device 10). Thus, the same operational effects as those in the example shown in FIG. 3A to FIG. 5C can be realized. More specifically, the user visually recognizes whether the part of the object group 57 in the different display mode is moved (shifted) along the moving direction of the operation finger, and thus can easily determine whether the moving operation of the cursor 56 by the pointing device 10 can appropriately be continued. In addition, the user recognizes the direction in which the part of the object group 57 in the different display mode are shifted, and can thereby easily comprehend the moving direction of the cursor 56 on the operation screen 50.

Note that the object group 57 configured by arranging a number of the grains at the equally spaced intervals from the right to the left and the up to the down is used in this example; however, a planar graphic object (a plane object) that covers the area where the grains of the object group 57 are arranged may be used, for example. In such a case, when the state where the pointing device 10 (the recognition section 12) does not recognize the operation finger is shifted to the state where the pointing device 10 (the recognition section 12) recognizes the operation finger, a color of a part of the plane object that corresponds to the grains 57a is changed. Then, in accordance with the movement of the operation finger, which is recognized by the pointing device 10, the part in the different color of the plane object is shifted from the part that corresponds to the grains 57a to a part that corresponds to the grains 57b. Also, in such a modified example, the same operational effects as those in this example can be realized.

In addition, the graphic object group that is arranged in two dimensions is used in this example. However, a virtual three-dimensional space may be set in the background image 50b, and the graphic object group that is arranged in said three-dimensional space may be used. A description will hereinafter be made on the operation screen that includes the graphic object group arranged in the virtual three-dimensional space with reference to FIGS. 9A to 9C.

Figure 9A:
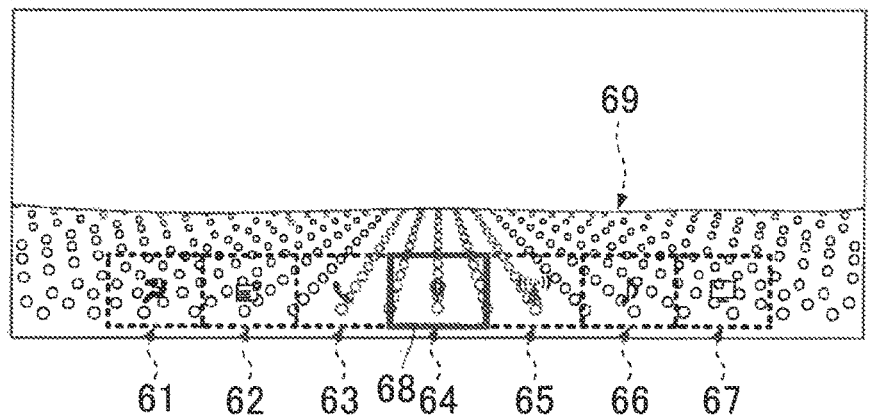
FIG. 9A is a view of yet another example of the operation screen by the display apparatus according to the first embodiment.
Figure 9B:
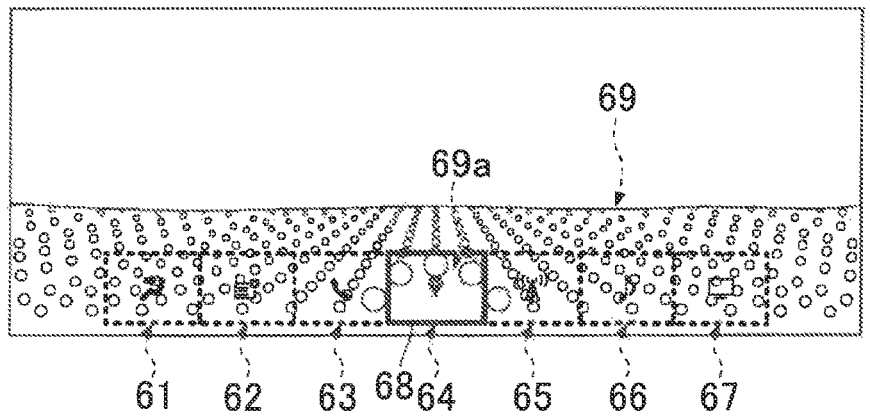
FIG. 9B is a view of yet another example of the operation screen by the display apparatus according to the first embodiment.
Figure 9C:
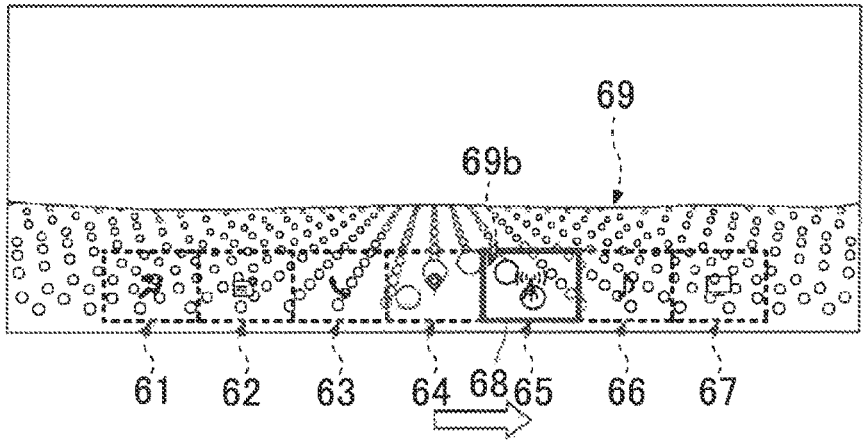
FIG. 9C is a view of yet another example of the operation screen by the display apparatus according to the first embodiment.

FIGS. 9A to 9C show yet another example of the operation screen by the display apparatus 1 (more specifically, the foreground image generation section 22, the background image generation section 23, and the composition processing section 24) according to this embodiment. FIG. 9A shows an operation screen 60 in the case where the pointing device 10 (the recognition section 12) does not recognize the operation finger. FIGS. 9B, 9C show the operation screen 60 in the case where the pointing device 10 (the recognition section 12) recognizes the operation finger. More specifically, FIG. 9B shows the operation screen 60 at a time when a state shown in FIG. 9A (the state where the pointing device 10 (the recognition section 12) does not recognize the operation finger) is shifted to a state where the pointing device 10 (the recognition section 12) recognizes the operation finger. FIG. 9C shows the operation screen 60 after the operation finger, which is recognized by the recognition section 12, starts being moved from the state shown in FIG. 9B.

Note that, when the state shown in FIG. 9B is shifted to the state shown in FIG. 9C, the user performs an operation of moving a cursor 68 in the right direction by moving the operation finger in the right direction on the operation section 11.

As shown in FIG. 9A, the operation screen 60 includes, as components of a foreground image: icons 61 to 67 as the selection targets; and a cursor 68 that selects either one of the icons 61 to 67. The icons 61 to 67 are sequentially arranged from the left to the right at a lower end of the operation screen 60. Because the pointing device 10 (the recognition section 12) does not recognize the operation finger in the state shown in FIG. 9A, a position of the cursor 68 corresponds to a position at termination of the last moving operation of the cursor 68 or a predetermined initial position of the cursor 68. In this example, the cursor 68 is arranged at the same position as the icon 64 (that is, on the icon 64) and is in a state of selecting the icon 64.

As shown in FIG. 9A, the operation screen 60 includes, as components of a background image, a graphic object group (hereinafter simply referred to as an "object group") 69 that is arranged in the virtual three-dimensional space on the operation screen 60. The object group 69 is configured by including a large number of the granular graphic objects (hereinafter simply referred to as the "grains") arranged in the virtual three-dimensional space in accordance with a specified rule, and are arranged (along the lateral direction) across a left end to a right end (an area including a moving area of the cursor 68 that moves in the lateral direction) of the operation screen 60.

When the state shown in FIG. 9A is shifted to the state where the pointing device 10 (the recognition section 12) recognizes the operation finger, as shown in FIG. 9B, grains 69a constituting a part of the object group 69, which is correlated with the position on the operation screen 60 corresponding to the state signal, are displayed in a different display mode from the other grains of the object group 69. More specifically, the grains 69a as the part of the object group 69 are displaced (raised) in a specified direction (the vertical direction) in the virtual three-dimensional space with respect to the grains as the other part of the object group 69, and are displayed in a mode of partially overlapping the icon 64, which is selected by the cursor 68, in a background. In this way, similar to the examples shown in FIG. 3A to FIG. 5C and FIG. 6A to FIG. 8C, the user can further easily comprehend the operation state on the operation screen 60. That is, the user recognizes a raise in the grains 69a, which constitutes the part of the object group 69, and thus can easily comprehend whether the operation screen 40 can be operated by the pointing device 10, the position of the cursor 68, and the like.

When the operation finger, which is recognized by the recognition section 12, starts being moved from the state shown in FIG. 9B, as shown in FIG. 9C, the cursor 68 is moved in the right direction along with the movement of the operation finger on the operation section 11 and is arranged at the same position as the icon 65 (that is, on the icon 65). In addition, because the position on the operation screen 60 that corresponds to the state signal is moved in the right direction in accordance with the movement of the operation finger on the operation section 11, the grains that constitute the part in the different display mode of the object group 69 are shifted from the grains 69a to grains 69b. That is, the grains that constitute the raised part of the object group 69 are shifted in the right direction along the moving direction of the operation finger on the operation section 11. In this way, the similar operational effects as those in examples shown in FIG. 3A to FIG. 5C and FIG. 6A to FIG. 8C can be realized. More specifically, the user visually recognizes whether the part in the different display mode of the object group 69 is moved (shifted) along the moving direction of the operation finger, and thus can easily determine whether the moving operation of the cursor 68 by the pointing device 10 can appropriately be continued. In addition, the user recognizes a direction in which the grains constituting the part in the different display mode are shifted, and can thereby easily comprehend the moving direction of the cursor 46 on the operation screen 60.

In this example, the object group 69 is arranged in the virtual three-dimensional space, and design of the operation screen 60 can thereby be produced.

Note that the object group 69, which is configured by arranging a large number of the grains in the virtual three-dimensional space, is used in this example; however, one graphic object (surface) that is formed by joining the grains of the object group 69 may be used, for example. In such a case, when the state where the pointing device 10 (the recognition section 12) does not recognize the operation finger is shifted to the state where the pointing device 10 (the recognition section 12) recognizes the operation finger, a part of the surface that corresponds to the grain 69a is raised in the virtual three-dimensional space. Then, in accordance with the movement of the operation finger, which is recognized by the pointing device 10, the part of the surface raised in the virtual three-dimensional space is shifted from the part that corresponds to the grains 69a to a part that corresponds to the grains 69b. Also, in such a modified example, the same operational effects as those in this example can be realized.

Second Embodiment

Next, a description will be made on a second embodiment.

A display apparatus 1 according to this embodiment uses a pointing device 10 to display an operation screen that includes a plurality of selection targets (a plurality of items constituting a scrollable list or the like), a selection operation of which can be performed, on a display 30. More specifically, the display apparatus 1 according to this embodiment differs from the display apparatus 1 according to the first embodiment in a point that the operation screen including the plurality of selection targets (the plurality of items constituting the list or the like) that are arranged along a specified axis on the operation screen, and a scrolling operation of which can be performed in a direction of said specified axis by using the pointing device 10, is displayed on the display 30. Hereinafter, a description will be centered on different portions from the first embodiment.

A configuration of the display apparatus 1 according to this embodiment is shown in FIG. 1 as in the first embodiment.

An ECU 20 is another example of the display control section that displays the operation screen on the display 30, and is an electronic control unit that executes processing of generating the operation screen. In accordance with a position of an operation finger on an operation section 11, which is recognized by a recognition section 12, the ECU 20 scrolls the plurality of selection targets (the plurality of items constituting the list or the like) that are arranged along the specified axis on the operation screen. Similar to the first embodiment, the ECU 20 includes a state reception section 21, a foreground image generation section 22, a background image generation section 23, a composition processing section 24, and a storage section 29.

In accordance with a content of the scrolling operation that corresponds to a state signal from the state reception section 21 (the pointing device 10), the foreground image generation section 22 determines arrangement of the plurality of selection targets (the plurality of items constituting the list or the like) on the operation screen. Then, the foreground image generation section 22 generates a foreground image of the operation screen that includes at least a part of the selection targets of the plurality of selection targets. This is because the number of the plurality of selection targets (the number of the items constituting the list) that can be selected by the scrolling operation using the pointing device 10 is usually larger than the number of the selection targets that can be displayed on the operation screen.

More specifically, based on the state signal received from the state reception section 21, the foreground image generation section 22 determines a scrolling amount, a scrolling direction, and the like of (the plurality of selection targets constituting) the list or the like. For example, the foreground image generation section 22 confirms a content of the scrolling operation (a type or the like of the scrolling operation) on the basis of the state signal. For example, in the case where the pointing device 10 is a touch pad, a scrolling operation by "dragging (tracing)" and a scrolling operation by "flicking" are available as the types of the scrolling operation. The scrolling operation by "dragging" is an operation of moving a finger at a relatively low speed while the finger remains in contact with an operation surface of the touch pad. Meanwhile, the scrolling operation by "flicking" is an operation of moving the finger at a relatively high speed in a mode of snapping the operation surface of the touch pad with the finger in a direction of the scrolling operation. For example, based on a determination on whether change amounts of the x-coordinate and the y-coordinate on the touch pad, which are based on the state signal received from the state reception section 21, are each equal to or larger than a specified threshold, the foreground image generation section 22 can determine whether the scrolling operation is by "dragging" or by "flicking". When determining that the scrolling operation is by "dragging", the foreground image generation section 22 determines the scrolling amount and the scrolling direction on the basis of the change amounts of the x-coordinate and the y-coordinate on the touch pad based on the state signal. For example, the foreground image generation section 22 stores fourth corresponding relationship information in the storage section 29 in advance, the fourth corresponding relationship information making the scrolling amount and the scrolling direction correlate with the change amounts of the x-coordinate and the y-coordinate on the touch pad. In this way, based on the fourth corresponding relationship information, the foreground image generation section 22 can determine the scrolling amount and the scrolling direction. Meanwhile, when determining that the scrolling operation is by "flicking", the foreground image generation section 22 determines a specified value, which is defined in advance for the scrolling operation by "flicking", as the scrolling amount, and determines the scrolling direction on the basis of the change amounts of the x-coordinate and the y-coordinate on the touch pad based on the state signal.

Then, the foreground image generation section 22 determines the arrangement of the selection targets in accordance with the determined scrolling amount and the determined scrolling direction, and generates the foreground image of the operation screen that includes at least the part of the selection targets of the plurality of selection targets (the plurality of items constituting the list).

Note that, also in the case where the pointing device 10 is a gesture recognition device, types corresponding to the scrolling operation by "dragging" and the scrolling operation by "flicking" on the touch pad can be provided in accordance with a speed of a gesture.

Similar to the first embodiment, the background image generation section 23 generates a background image of the operation screen that includes a graphic object arranged across a specified area on the operation screen or a graphic object group as collection of a large number of the graphic objects (individual objects).

Similar to the first embodiment, based on the state signal received from the state reception section 21, the background image generation section 23 determines whether the pointing device 10 (the recognition section 12) recognizes the operation finger.

Similar to the first embodiment, when determining that the pointing device 10 (the recognition section 12) does not recognize the operation finger, the background image generation section 23 generates the background image that includes the graphic object or the graphic object group in a predetermined display mode. Preferably, the background image generation section 23 may generate the background image that includes the graphic object or the graphic object group in a predetermined display mode in which a difference that visually attracts the user's attention is not included in the entire graphic object or the entire graphic object group.

On the other hand, similar to the first embodiment, when determining that the pointing device 10 (the recognition section 12) recognizes the operation finger, the background image generation section 23 changes a display mode of a part of the graphic object to differ from a display mode of the other parts of the graphic object or changes a display mode of a part of the graphic object group to differ from a display mode of the other parts of the graphic object group. Then, in accordance with the content of the scrolling operation (the type or the like of the scrolling operation), the background image generation section 23 shifts (moves) the part in the different display mode of the graphic object or the graphic object group in the same direction as the scrolling operation.

For example, similar to the foreground image generation section 22, the background image generation section 23 confirms the content of the scrolling operation (the type or the like of the scrolling operation) on the basis of the state signal received from the state reception section 21. Then, when determining that the scrolling operation is by "dragging", the background image generation section 23 determines the scrolling amount and the scrolling direction on the basis of the fourth corresponding relationship information. On the other hand, when determining that the scrolling operation is by "flicking", similar to the foreground image generation section 22, the background image generation section 23 determines the specified value that is defined in advance for the scrolling operation by "flicking" as the scrolling amount, and determines the scrolling direction on the basis of the change amounts of the x-coordinate and the y-coordinate on the touch pad based on the state signal. Then, in accordance with the determined scrolling amount and the determined scrolling direction, the background image generation section 23 generates the background image in a mode in which the part in the different display mode of the graphic object or the graphic object group is shifted (moved) in the same direction as the scrolling operation in a period that corresponds to the content of the scrolling operation. The background image generated by the background image generation section 23 will be described in detail below.

Note that the "period that corresponds to the content of the scrolling operation" means a period that is defined in advance in accordance with the content of the scrolling operation (the type of the scrolling operation). For example, in the case of the scrolling operation by "dragging", "period that corresponds to the content of the scrolling operation" may be a period in which the scrolling operation continues (that is, a period in which the recognition section 12 recognizes the operation finger). Meanwhile, in the case of the scrolling operation by "flicking", because a finger contact period (that is, the period in which the recognition section 12 recognizes the operation finger) is short, a predetermined period is set for the scrolling operation by "flicking". For example, the plurality of operation targets (the plurality of items constituting the list) are scrolled at a relatively high speed in the scrolling operation by "flicking". Thus, the predetermined period may be a relatively short period.

Next, a description will be made on one example of the operation screen by the display apparatus 1, more specifically, the foreground image generation section 22, the background image generation section 23, and the composition processing section 24 according to this embodiment with reference to FIG. 10A to FIG. 12C.

Figure 10A:
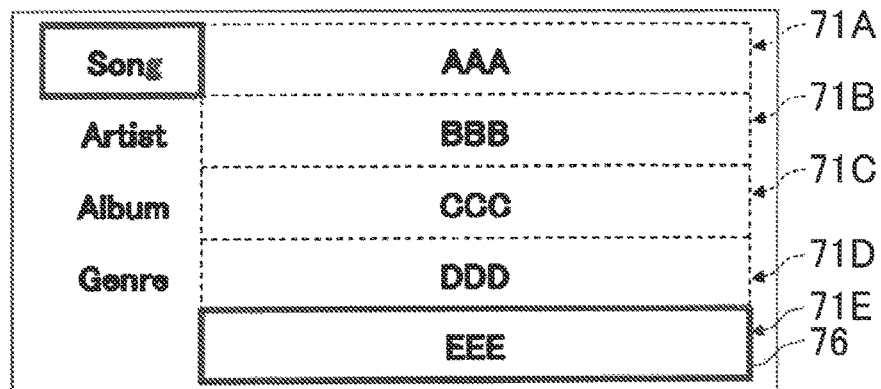
FIG. 10A is a view of one example of a foreground image by a display apparatus according to a second embodiment.
Figure 10B:
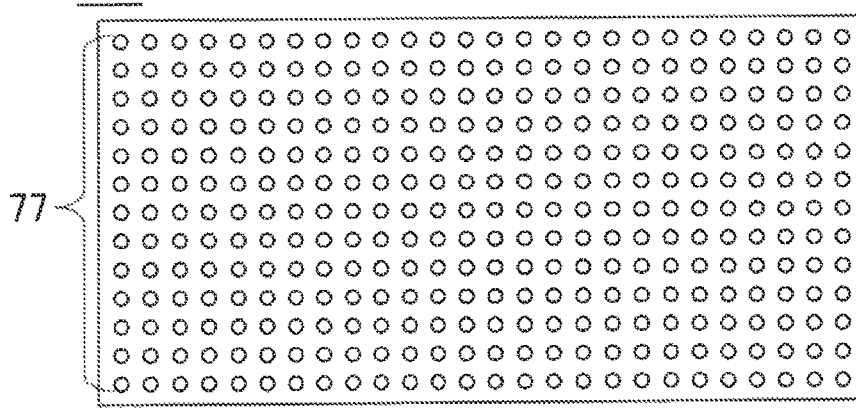
FIG. 10B is a view of one example of a background image by the display apparatus according to the second embodiment.
Figure 10C:
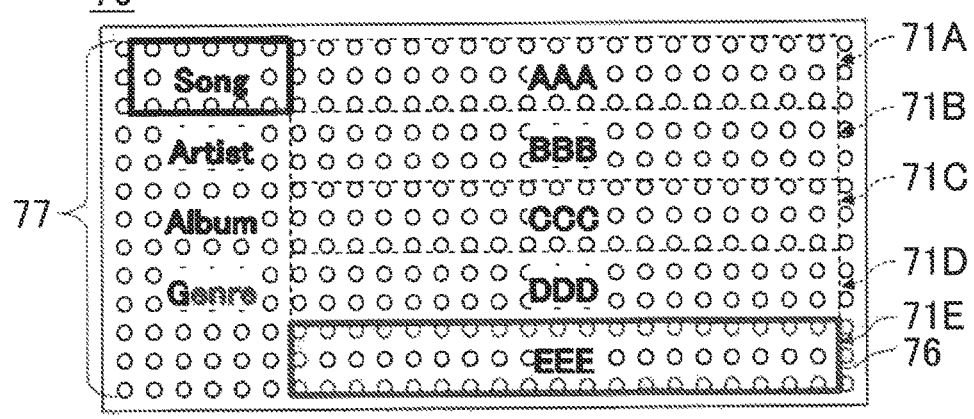
FIG. 10C is a view of one example of an operation screen by the display apparatus according to the second embodiment.
Figure 11A:
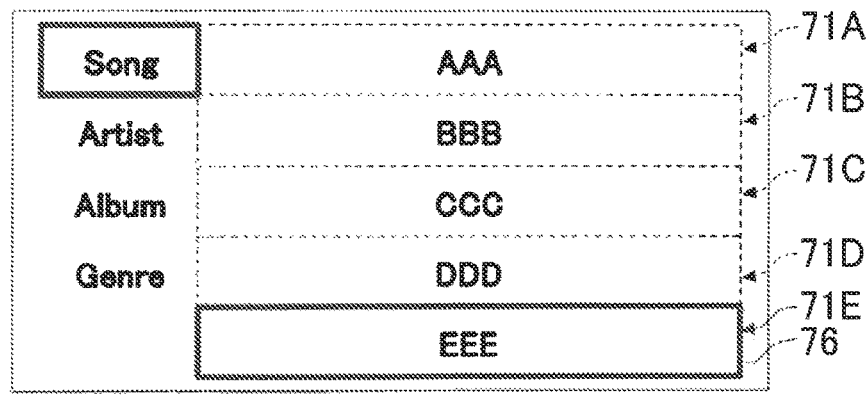
FIG. 11A is a view of the one example of the foreground image by the display apparatus according to the second embodiment.
Figure 11B:
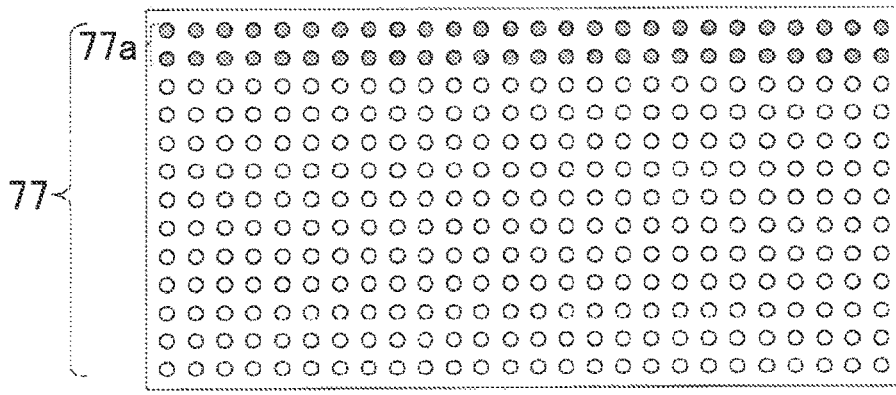
FIG. 11B is a view of the one example of the background image by the display apparatus according to the second embodiment.
Figure 11C:
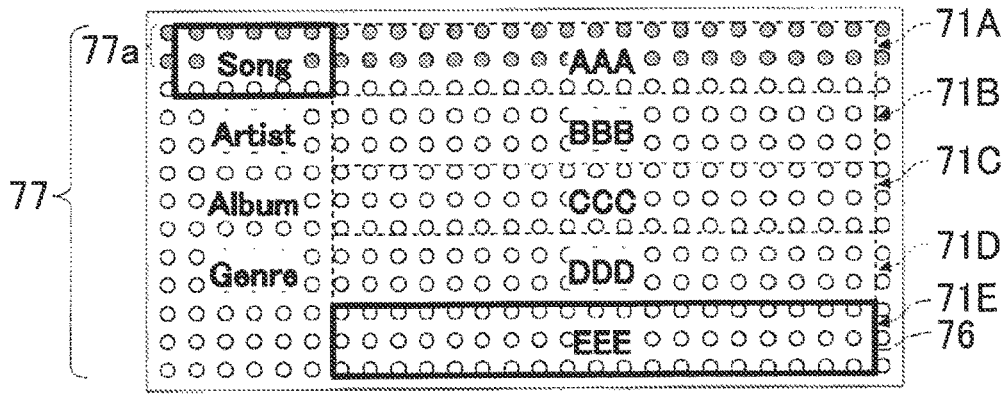
FIG. 11C is a view of the one example of the operation screen by the display apparatus according to the second embodiment.
Figure 12A:
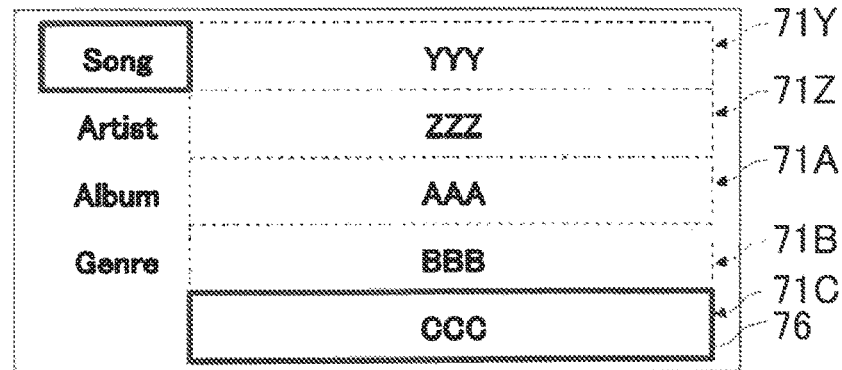
FIG. 12A is a view of the one example of the foreground image by the display apparatus according to the second embodiment.
Figure 12B:
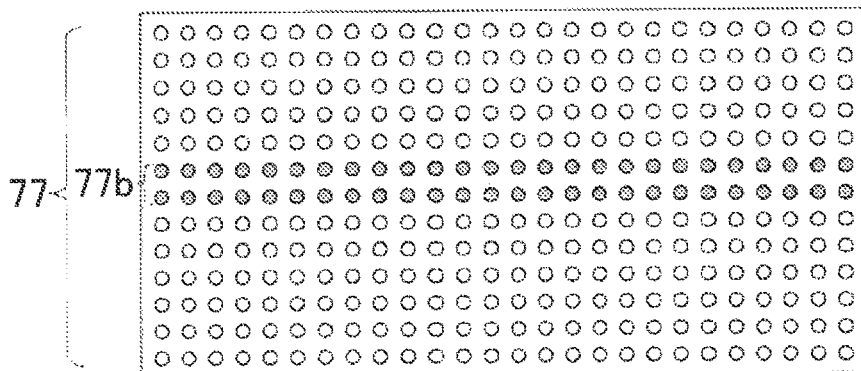
FIG. 12B is a view of the one example of the background image by the display apparatus according to the second embodiment.
Figure 12C:
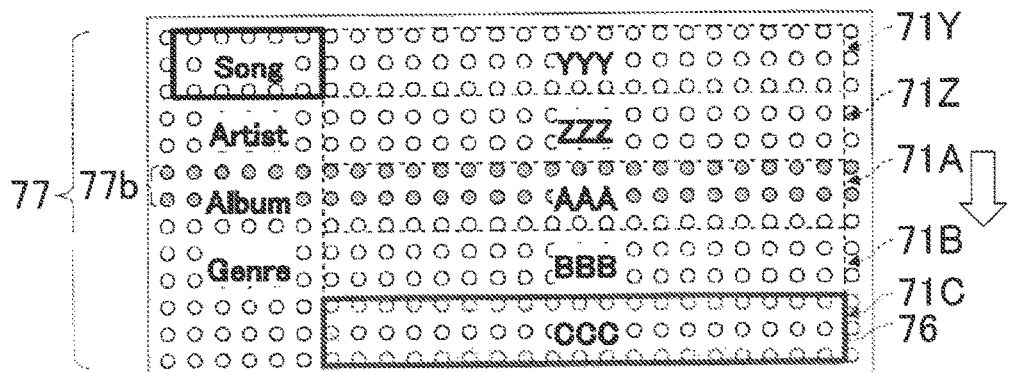
FIG. 12C is a view of the one example of the operation screen by the display apparatus according to the second embodiment.

FIG. 10A to FIG. 12C shows the one example of the operation screen by the display apparatus 1 (more specifically, the foreground image generation section 22, the background image generation section 23, and the composition processing section 24) according to this embodiment. FIG. 10A, FIG. 10B, and FIG. 10C respectively show a foreground image 70a, a background image 70b, and an operation screen 70 in the case where the pointing device 10 (the recognition section 12) does not recognize the operation finger. In addition, FIGS. 11A, 12A, FIGS. 11B, 12B, and FIGS. 11C, 12C respectively show the foreground image 70a, the background image 70b, and the operation screen 70 in the case where the pointing device 10 (the recognition section 12) recognizes the operation finger. More specifically, FIG. 11A, FIG. 11B, and FIG. 11C respectively show the foreground image 70a, the background image 70b, and the operation screen 70 at a time when a state shown in FIG. 10A, FIG. 10B, and FIG. 10C (a state where the pointing device 10 (the recognition section 12) does not recognize the operation finger) is shifted to a state where the pointing device 10 (the recognition section 12) recognizes the operation finger. FIG. 12A, FIG. 12B, and FIG. 12C respectively show the foreground image 70a, the background image 70b, and the operation screen 70 after the operation finger, which is recognized by the recognition section 12, starts being moved from the state shown in FIG. 11A, FIG. 11B, and FIG. 11C.

Note that a song list 71 includes a plurality of songs 71A to 71Z (26 songs), an example of a plurality of selection targets, that are more than displayable songs (5 songs) on the operation screen 70.

First, a description will be made on the operation screen 70 in the case where the pointing device 10 (the recognition section 12) does not recognize the operation finger with reference to FIGS. 10A to 10C.

As shown in FIG. 10A, the foreground image 70a includes: the songs 71A to 71E as a part of the songs included in the song list 71; and a fixed cursor 76 that selects either one of the songs 71A to 71Z included in the song list 71. When the scrolling operation of the song list 71 is performed to position either one of the songs 71A to 71Z at the cursor 76, either one of the songs 71A to 71Z can be played from a specified audio source (for example, a CD or the like) in audio equipment that is mounted on the vehicle. The songs 71A to 71E are sequentially arranged from an upper end to a lower end within an area in a lateral direction that excludes a left end of the foreground image 70a (that is, the operation screen 70). In addition, the cursor 76 is fixed at the lower end within the area in the lateral direction that excludes the left end of the foreground image 70a (that is, the operation screen 70). In the state shown in FIG. 10A, the cursor 76 and the song 71E are arranged at the same position (the cursor 76 is arranged on the song 71E), and the song 71E is selected.

In addition, as shown in FIG. 10B, the background image 70b includes a graphic object group (hereinafter referred to as an "object group") 77 that is configured by including a large number of granular graphic objects (hereinafter simply referred to as "grains"). The object group 77 is arranged such that the grains as components are arranged at equally spaced intervals from right to left and up to down across a specified area on the background image 70b (that is, the operation screen 70), more specifically, an entire area on the operation screen 70 in a vertical direction and the lateral direction. When determining that the pointing device 10 (the recognition section 12) does not recognize the operation finger, the background image generation section 23 generates the background image 70b that includes the object group 77 in a predetermined display mode, that is, a display mode in which the grains in the same color are arranged at the equally spaced intervals from the right to the left and the up to the down in this example.

Then, the composition processing section 24 composes the foreground image 70a in FIG. 10A and the background image 70b in FIG. 10B to generate the operation screen 70. As shown in FIG. 10C, the operation screen 70 includes: the songs 71A to 71E as the part of the song list 71 that is arranged in line in the vertical direction; and the cursor 76 that is arranged at the same position as the song 71E (that is, on the song 71E). The operation screen 70 also includes the object group 77 configured by including the grains in the same color, which are arranged at the equally spaced intervals from the right to the left and the up to the down across the entire area, in a background.

Next, a description will be made on the operation screen 70 at a time when the state where the pointing device 10 (the recognition section 12) does not recognize the operation finger is shifted to the state where the pointing device 10 (the recognition section 12) recognizes the operation finger with reference to FIGS. 11A to 11C.

Note that the direction of the scrolling operation in this example, that is, the moving direction of the operation finger on the operation section 11 is downward.

As shown in FIG. 11A, when the state of the operation screen 70 shown in FIG. 10C is shifted to the state where the pointing device 10 (the recognition section 12) recognizes the operation finger, scrolling of the song list 71 is not started. Thus, the foreground image generation section 22 generates the same foreground image 50a as in FIG. 10A.

In addition, when determining that the pointing device 10 (the recognition section 12) recognizes the operation finger on the basis of the state signal from the state reception section 21, as shown in FIG. 11B, the background image generation section 23 generates the background image 70b in which grains 77a that constitute a part of the object group 77 are in a different display mode from the other grains of the object group 77. More specifically, of the grains included in the object group 77, the grains 77a are grains in two rows that are located at the upper end of the operation screen 70, and have a different color from the other grains of the object group 77.

Then, the composition processing section 24 composes the foreground image 70a in FIG. 11A and the background image 70b in FIG. 11B to generate the operation screen 70. As shown in FIG. 11C, the operation screen 70 includes: the songs 71A to 71E as the part of the song list 71 that is arranged in line in the vertical direction; and the cursor 76 that is arranged at the same position as the song 71E (that is, on the song 71E). The operation screen 70 also includes the object group 77 configured by including the grains, which are arranged at the equally spaced intervals from the right to the left and the up to the down across the entire area, in the background, and the color of the grains 77a that constitute the part of the object group 77 is displayed in the different mode from the color of the other grains of the object group 77. In this example, the grains 77a are configured by including the grains in the two rows that are located at the upper end of the operation screen 70.

As described above, in the case where the pointing device 10 (the recognition section 12) recognizes the operation finger, the part (the grains 77a) of the object group 77 is set in the different display mode from the other part (the other grains) of the object group 77. In this way, the user can further easily comprehend the operation state on the operation screen. More specifically, the user recognizes a color change of the grains 77a as the part of the object group 77, and thus can easily determine whether the operation screen 50 can be operated by the pointing device 10 (more specifically, whether the operable state continues). In addition, by recognizing the color change of the grains 77a as the part of the object group 77, the user can easily comprehend that the song list 71 is scrolled in accordance with the operation using the pointing device 10.

Next, a description will be made on the operation screen 70 after the operation finger, which is recognized by the recognition section 12, starts being moved with reference to FIGS. 12A to 12C.

As shown in FIG. 12A, the displayable songs are updated from the state shown in FIG. 11A in accordance with movement of the operation finger on the operation section 11. More specifically, when the song list 71 is scrolled downward, the foreground image 70a no longer includes the songs 71A, 71B but includes the songs 71Y, 71Z instead. In a state shown in FIG. 12A, the cursor 76 and the song 71C are arranged at the same position (the cursor 76 is arranged on the song 71C), and the song 71C is selected.

In addition, as shown in FIG. 12B, the background image generation section 23 generates the background image 70b in which grains 77b that constitutes a part of the object group 77 are in a different display mode from the other grains of the object group 77. At this time, the grains as the part in the different color of the object group 77 are shifted from the grains 77a to the grains 77b in accordance with the movement of the operation finger on the operation section 11. More specifically, the grains 77b are arranged on a lower side of the grains 77a, and the grains that constitute the part in the different color of the object group 77 are shifted downward along the moving direction of the operation finger on the operation section 11.

Then, the composition processing section 24 composes the foreground image 70a in FIG. 12A and the background image 70b in FIG. 12B to generate the operation screen 70. As shown in FIG. 12C, the operation screen 70 includes: the songs 71Y, 71Z and the songs 71A to 71C as the part of the song list 71 that is arranged in line in the vertical direction; and the cursor 76 that is arranged at the same position as the song 71C (that is, on the song 71C). The operation screen 70 also includes the object group 77 configured by including the grains, which are arranged at the equally spaced intervals from the right to the left and the up to the down across the entire area, in the background, and the color of the grains 77b that constitute the part of the object group 77 is displayed in the different mode from the color of the other grains of the object group 77. In this example, the grains 77b are configured by including the grains in the two rows of the object group 77 that are located near center in the vertical direction of the operation screen 70.

As described above, when the operation finger, which is recognized by the pointing device 10 (the recognition section 12), is moved on the operation section 11, the grains (the grains 77a, 77b) that constitute the part of the object group 77 displayed in the different display mode (the mode of the different color from the other grains) are shifted along the moving direction (the down direction) of the operation finger (an outlined arrow in FIG. 12C). Accordingly, the user visually recognizes whether the part in the different display mode of the object group 77 is moved (shifted) along the moving direction of the operation finger, and thus can easily determine whether the scrolling operation of the song list 71 by the pointing device 10 can appropriately be continued. In addition, the user recognizes a direction in which the grains constituting the part displayed in the different display mode of the object group 77 displayed as the background are shifted, and can thereby easily comprehend the scrolling direction on the operation screen 70 in accordance with the operation using the pointing device 10.

Note that the object group 77 configured by including a number of the grains, which are arranged at the equally spaced intervals from the right to the left and the up to the down, is used in this example; however, a planar graphic object (a plane object) that covers an area where the grains of the object group 77 are arranged may be used, for example. In such a case, when the state where the pointing device 10 (the recognition section 12) does not recognize the operation finger is shifted to the state where the pointing device 10 (the recognition section 12) recognizes the operation finger, a color of a part of the plane object that corresponds to the grains 77a is changed. Then, in accordance with the movement of the operation finger, which is recognized by the pointing device 10, the part in the different color of the plane object is shifted from the part that corresponds to the grains 77a to a part that corresponds to the grains 77b. Also, in such a modified example, the same operational effects as those in this example can be realized.

In addition, the graphic object group that is arranged in a plane on the operation screen is used in this example. However, a virtual three-dimensional space may be set in the background image 70b, and a graphic object or a graphic object group that is arranged in said three-dimensional space may be used. Also, in such a modified example, the same operational effects as those in this example can be realized.

The mode for carrying out the disclosure has been described in detail so far. However, the disclosure is not limited to such a particular embodiment, and various modifications and changes can be made thereto within a scope of gist of the disclosure described in the claims.

What is claimed is:

1. A vehicular display apparatus comprising:
   a display section;
   a pointing device that includes an operation section and a recognition section that recognizes an operation finger operating the operation section; and
   a display control section that is configured to display an operation screen on the display section, the operation screen including a plurality of selection targets, a selection operation of which is able to be performed by using the pointing device, wherein
   the display control section is further configured to:
      generate at least one of an image in which a cursor for selecting one selection target from the plurality of selection targets is moved and an image in which the plurality of selection targets that are arranged along a specified axis on the operation screen are scrolled in accordance with a position of the operation finger, which is recognized by the recognition section, on the operation section,
      generate an image that includes a plurality of grains across a specified area on the operation screen,
      execute processing of setting a part of the plurality of grains in a different display mode from another part of the plurality of grains when the operation finger is recognized by the recognition section, and
      determine the part of the plurality of grains based on and corresponding to a position of the operation finger operating the operation section.

2. The vehicular display apparatus according to claim 1, wherein
   the display control section is configured to generate an image in which the part in the different display mode of the plurality of grains is moved along a moving direction of the operation finger when the operation finger, which is recognized by the recognition section, is moved with respect to the operation section.

3. The vehicular display apparatus according to claim 1, wherein
   the display control section is configured to generate the operation screen by composing a foreground image that includes the plurality of selection targets and a background image that includes the plurality of grains.

4. The vehicular display apparatus according to claim 1, wherein
   the plurality of selection targets are arranged in line in a first direction on the operation screen,
   the plurality of grains is arranged along the first direction, and
   the display control section is configured to generate an image in which the part of the plurality of grains is displaced in a second direction that crosses the first direction with respect to the other part of the plurality of grains when the operation finger is recognized by the recognition section.

5. The vehicular display apparatus according to claim 4, wherein
   an amount of displacement of the plurality of grains in the second direction is reduced as the plurality of grains separate from a position on the operation screen in the first direction, the position corresponding to a state signal from the pointing device.

6. The vehicular display apparatus according to claim 1, wherein
   the plurality of grains is arranged in a virtual three-dimensional space, and
   the display control section is configured to generate an image in which the part of the plurality of grains is raised in a specified direction in the virtual three-dimensional space with respect to the other part of the plurality of grains when the operation finger is recognized by the recognition section.

* * * * *